(12) United States Patent
Kim et al.

(10) Patent No.: US 10,598,538 B2
(45) Date of Patent: Mar. 24, 2020

(54) SYSTEM AND METHOD FOR MEASURING LIQUID LEVEL OF VEHICLE FUEL TANK

(71) Applicant: COAVIS, Sejong-si (KR)

(72) Inventors: Se Jin Kim, Sejong-si (KR); In Gon Kim, Sejong-si (KR); Jong Hyuk Yoon, Sejong-si (KR)

(73) Assignee: COAVIS, Sejong-si (KR)

( * ) Notice: Subject to any disclaimer, the term of this patent is extended or adjusted under 35 U.S.C. 154(b) by 389 days.

(21) Appl. No.: 15/621,933

(22) Filed: Jun. 13, 2017

(65) Prior Publication Data

US 2017/0363459 A1 Dec. 21, 2017

(30) Foreign Application Priority Data

Jun. 21, 2016 (KR) ........................ 10-2016-0077206

(51) Int. Cl.
  *G01F 23/296* (2006.01)
  *G01S 7/52* (2006.01)
  *G01F 25/00* (2006.01)
  *G01S 15/88* (2006.01)

(52) U.S. Cl.
  CPC ...... *G01F 23/2962* (2013.01); *G01F 23/2968* (2013.01); *G01F 25/0061* (2013.01); *G01S 7/52004* (2013.01); *G01F 23/296* (2013.01); *G01S 15/88* (2013.01); *G01S 2007/52014* (2013.01)

(58) Field of Classification Search
  CPC .......... G01F 23/2962; G01F 23/2968; G01F 23/296; G01S 15/88
  See application file for complete search history.

(56) References Cited

U.S. PATENT DOCUMENTS

| 4,427,132 A * | 1/1984 | Thomson ................ G01F 1/007 222/23 |
| 4,853,694 A * | 8/1989 | Tomecek ............ G01F 23/0061 340/621 |
| 6,588,269 B1 * | 7/2003 | Benghezal .......... G01F 23/2962 181/124 |
| 2004/0007061 A1 * | 1/2004 | Forgue ................ G01F 23/2962 73/290 V |
| 2007/0203668 A1 * | 8/2007 | Reimer ............... G01F 23/2962 702/159 |
| 2015/0323373 A1 * | 11/2015 | Maguin ................ G01N 29/024 73/290 V |

FOREIGN PATENT DOCUMENTS

KR   1019990058443 A   7/1999

* cited by examiner

*Primary Examiner* — Regis J Betsch
(74) *Attorney, Agent, or Firm* — McCoy Russell LLP

(57) ABSTRACT

Provided are a system and a method for measuring a liquid level of a vehicle fuel tank, and more particularly, to a system for measuring a liquid level of a vehicle fuel tank including an ultrasonic sensor unit provided on a bottom surface in the vehicle fuel tank to acquire measurement data for calculating a distance from the bottom surface in the fuel tank to a fuel surface and a central processing unit using the measurement data transmitted from the ultrasonic sensor unit by a preset number of times for a preset time to calculate liquid level information of the fuel tank.

12 Claims, 14 Drawing Sheets

SYSTEM AND METHOD FOR MEASURING LIQUID LEVEL OF VEHICLE FUEL TANK

CROSS-REFERENCE TO RELATED APPLICATIONS

This application claims priority under 35 U.S.C. § 119 to Korean Patent Application No. 10-2016-0077206, filed on Jun. 21, 2016, in the Korean Intellectual Property Office, the disclosure of which is incorporated herein by reference in its entirety for all purposes.

TECHNICAL FIELD

The following disclosure relates to a system and a method for measuring a liquid level of a vehicle fuel tank, and more particularly, to a system and a method for measuring a liquid level of a vehicle fuel tank capable of measuring a liquid level with a minimum measurement error by receiving a plurality of liquid level measurement data and performing a calculation in order to accurately measure the liquid level of the fuel in the vehicle fuel tank using the ultrasonic sensor.

BACKGROUND

If a temperature of fuel in a vehicle fuel tank is equal to or higher than a boiling point according to the external environment, as shown in FIG. 1, the fuel is boiled and thus bubbles are generated.

At this time, in order to measure a liquid level of the fuel in the vehicle fuel tank, when an ultrasonic signal is transmitted from an oscillator for measuring a distance to a fuel surface using an ultrasonic sensor, a diffused reflection or scattering phenomenon due to bubbles occurs.

As shown in FIG. 1, when the diffused reflection or scattering phenomenon occurs due to the bubbles, the ultrasonic signal reflected from a response unit may not be received, and therefore it is recognized that there is no fuel, such that there is a problem that it is difficult to accurately measure the liquid level.

Korean Patent Laid-Open Publication No. 10-1999-0058443 ("Apparatus and method for measuring fuel amount using ultrasonic sensor", hereinafter referred to as related art document 1) discloses an apparatus and a method for measuring a fuel amount remaining in a fuel tank by measuring a distance to a fuel surface using an ultrasonic sensor installed on an inner wall of the fuel tank.

However, the related art document 1 does not disclose a method for overcoming a measurement error of an ultrasonic sensor when fuel boils and thus bubbles are generated.

RELATED ART DOCUMENT

Patent Document (Patent Document 1) Korean Patent Laid-Open Publication No. 10-1999-0058443 (Published on Jul. 15, 1999)

SUMMARY

An embodiment of the present invention is directed to providing a system and a method for measuring a liquid level of a vehicle fuel tank capable of measuring the liquid level with a minimum measurement error by receiving a plurality of liquid level measurement data using an ultrasonic sensor and performing a calculation in order to accurately measure the liquid level of the fuel in the vehicle fuel tank using the ultrasonic sensor.

In one general aspect, a system for measuring a liquid level of a vehicle fuel tank includes: an ultrasonic sensor unit 100 provided on a bottom surface in the vehicle fuel tank to acquire measurement data for calculating a distance from the bottom surface in the fuel tank to a fuel surface; and a central processing unit 200 using the measurement data transmitted from the ultrasonic sensor unit 100 by a preset number of times for a preset time to calculate liquid level information of the fuel tank.

The ultrasonic sensor unit 100 may include: a reference sensor 110 acquiring a time-of-flight reference (TOF Ref.) for setting a reference of a transmitting and receiving speed of an ultrasonic signal depending on a fuel state in the fuel tank; and a measurement sensor 120 transmitting an ultrasonic signal to a fuel surface of the fuel tank and receiving a ultrasonic signal reflected from the fuel surface to acquire a time-of-flight surface level (TOF Lev.) for calculating the liquid level of the fuel tank.

The central processing unit 200 may include: a first validity determination unit 210 receiving a ringing time acquired upon the transmission of the ultrasonic wave of the measurement sensor 120 to determine validity of the measurement data, a liquid level calculation unit 220 using the time-of-flight reference (TOF Ref.) transmitted from the reference sensor 110 and the plurality of time-of-flight surface levels (TOF Levs.) transmitted from the measurement sensor 120 to calculate the liquid level information of the fuel tank, and a second validity determination unit 230 using the time-of-flight reference (TOF Ref.) transmitted from the reference sensor 110 and the time-of-flight surface level (TOF Lev.) transmitted from the measurement sensor 120 to determine validity of the liquid level information calculated by the liquid level calculation unit 220.

The first validity determination unit 210 may determine the measurement data acquired by the reference sensor 110 or the measurement sensor 120 as valid measurement data if the ringing time of the reference sensor 110 or the ringing time of the measurement sensor 120 is equal to or greater than a preset reference point (threshold), and the liquid level calculation unit 220 may receive the plurality of time-of-flight references and time-of-flight surface levels by a preset number of times for a preset time to calculate a plurality of initial liquid level information, align the plurality of initial liquid level information in an ascending order or a descending order, calculate final liquid level information as an intermediate value when the number of initial liquid level information remaining after excluding the initial liquid level information corresponding to a preset reference value or less or zero from the plurality of initial liquid level information is odd, and calculate the final liquid level information as the average value of the intermediate two initial liquid level information when the number of remaining initial liquid level information is even.

The second validity determination unit 230 may determine the calculated final liquid level information as invalid final liquid level information when the initial liquid level information equal to or more than half among the plurality of initial liquid level information calculated by the liquid level calculation unit 220 corresponds to the preset reference value or less or zero.

The system may further include a display unit 300 outputting the liquid level information of the fuel tank transmitted from the central processing unit 200 to enable a vehicle driver to check the information.

The display unit 300 may include: a liquid level output unit 310 receiving and outputting the liquid level information of the fuel tank calculated by the liquid level calculation unit 220 to enable the vehicle driver to check the information; a system warning unit 320 outputting the liquid level information to enable the vehicle driver to recognize accuracy of the liquid level information, depending on the validity of the measurement data determined by the first validity determination unit 210 or the validity of the liquid level information determined by the second validity determination unit 230; and a fuel warning unit 330 outputting necessity of oil supply to enable the vehicle driver to recognize the necessity of oil supply, if the liquid level information of the fuel tank calculated by the liquid level calculation unit 220 corresponds to a preset oil supplying reference value or less.

In another general aspect, a method for measuring a liquid level of a vehicle fuel tank including an ultrasonic sensor unit provided on a bottom surface in the vehicle fuel tank to acquire and transmit measurement data for calculating a distance from the bottom surface in the fuel tank to a fuel surface, the method includes: a measuring step (S20) of receiving, by the central processing unit, the plurality of measurement data from the ultrasonic sensor unit by a preset number of times for a preset time; an aligning step (S40) of using, by the central processing unit, the plurality of measurement data received in the measuring step (S20) to calculate a plurality of initial liquid level information and aligning the plurality of initial liquid level information in an ascending order or a descending order; a correcting step (S60) of excluding, by the central processing unit, initial liquid level information corresponding to a preset reference value or less or zero from the plurality of initial liquid level information aligned in the aligning step (S40); and a liquid level measuring step (S80) of using, by the central processing unit, the initial liquid level information remaining after excluding the initial liquid level information in the correcting step (S60) to calculate final liquid level information.

The method may further include a displaying step of transmitting the calculated final liquid level information to the display unit and displaying the calculated final liquid level information on the display unit.

When the number of aligned initial liquid level information remaining after excluding the initial liquid level information corresponding to a preset reference value or less or zero from the plurality of initial liquid level information is odd, the central processing unit may calculate final liquid level information as an intermediate value, and when the number of aligned initial liquid level information remaining after excluding the initial liquid level information corresponding to a preset reference value or less or zero from the plurality of initial liquid level information is even, the central processing unit may calculate the final liquid level information as the average value of the intermediate two initial liquid level information.

After the final liquid level information is calculated, the central processing unit may perform a step of removing one measurement data first received from the plurality of measurement data received in the measuring step and then a step of receiving one new measurement data, and then repeatedly perform the removing and receiving operations.

In another general aspect, a method for measuring a liquid level of a vehicle fuel tank including an ultrasonic sensor unit provided on a bottom surface in the vehicle fuel tank to acquire and transmit measurement data for calculating a distance from the bottom surface in the fuel tank to a fuel surface, the method includes: a measuring step (S200) of receiving, by the central processing unit, the plurality of measurement data transmitted from the ultrasonic sensor by a preset number of times for a preset time; a correcting step (S400) of using, by the central processing unit, the plurality of measurement data received in the measuring step (S200) to calculate a plurality of initial liquid level information and excluding initial liquid level information corresponding to a preset reference value or less or zero from the plurality of initial liquid level information; an aligning step (S600) of aligning, by the central processing unit, the initial liquid level information remaining after excluding the initial liquid level information in the correcting step (S400) in an ascending order or a descending order; and a liquid level measuring step (S800) of using, by the central processing unit, the initial liquid level information aligned in the aligning step (S600) to calculate final liquid level information.

The method may further include a displaying step of transmitting the calculated final liquid level information to the display unit and displaying the calculated final liquid level information on the display unit.

When the number of initial liquid level information remaining after excluding the initial liquid level information corresponding to a preset reference value or less or zero from the plurality of initial liquid level information is odd, the central processing unit may calculate final liquid level information as an intermediate value, and when the number of initial liquid level information remaining after excluding the initial liquid level information corresponding to a preset reference value or less or zero from the plurality of initial liquid level information is even, the central processing unit may calculate the final liquid level information as the average value of the intermediate two initial liquid level information.

After the final liquid level information is calculated, the central processing unit may perform a step of removing one measurement data first received from the plurality of measurement data received in the measuring step and then a step of receiving one new measurement data, and then repeatedly perform the removing and receiving operations.

In another general aspect, a method for measuring a liquid level of a vehicle fuel tank including an ultrasonic sensor unit provided on a bottom surface in the vehicle fuel tank to acquire and transmit measurement data for calculating a distance from the bottom surface in the fuel tank to a fuel surface, the method includes: a first validity determining step (S10a) of using, by a central processing unit, a ringing time acquired when the ultrasonic sensor unit transmits an ultrasonic wave to determine validity of measurement data transmitted from the ultrasonic sensor unit; a measuring step (S20a) of receiving, by the central processing unit, the plurality of measurement data from the ultrasonic sensor unit by a preset number of times for a preset time; an aligning step (S40a) of using, by the central processing unit, the plurality of measurement data received in the measuring step (S20a) to calculate a plurality of initial liquid level information and aligning the plurality of initial liquid level information in an ascending order or a descending order; a correcting step (S60a) of excluding, by the central processing unit, initial liquid level information corresponding to a preset reference value or less or zero from the plurality of initial liquid level information aligned in the aligning step (S40a); and a liquid level measuring step (S80a) of using, by the central processing unit, the initial liquid level information remaining after excluding the initial liquid level information in the correcting step (S60a) to calculate final liquid level information.

The central processing unit may use a ringing time acquired when the ultrasonic sensor unit transmits an ultrasonic wave to determine the measurement data transmitted from the ultrasonic sensor unit as valid measurement data if the ringing time is equal to or greater than a preset threshold, and the method may further include a displaying step of transmitting the liquid level information to a display unit and displaying the liquid level information on the display unit to enable a vehicle driver to recognize accuracy of the liquid level information depending on validity of the measurement data determined.

When the number of initial liquid level information remaining after excluding the initial liquid level information corresponding to a preset reference value or less or zero from the plurality of initial liquid level information is odd, the central processing unit may calculate final liquid level information as an intermediate value, and when the number of initial liquid level information remaining after excluding the initial liquid level information corresponding to a preset reference value or less or zero from the plurality of initial liquid level information is even, the central processing unit may calculate the final liquid level information as the average value of the intermediate two initial liquid level information.

After the final liquid level information is calculated, the central processing unit may perform a step of removing one measurement data first received from the plurality of measurement data received and then a step of receiving one new measurement data, and then repeatedly perform the removing and receiving operations.

In another general aspect, a method for measuring a liquid level of a vehicle fuel tank including an ultrasonic sensor unit provided on a bottom surface in the vehicle fuel tank to acquire and transmit measurement data for calculating a distance from the bottom surface in the fuel tank to a fuel surface, the method includes; a measuring step (S20$b$) of receiving, by the central processing unit, the plurality of measurement data from the ultrasonic sensor unit by a preset number of times for a preset time; an aligning step (S40$b$) of using, by the central processing unit, the plurality of measurement data transmitted in the measuring step (S20$b$) to calculate a plurality of initial liquid level information and aligning the plurality of initial liquid level information in an ascending order or a descending order; a correcting step (S60$b$) of excluding, by the central processing unit, initial liquid level information corresponding to a preset reference value or less or zero from the plurality of initial liquid level information aligned in the aligning step (S40$b$); a liquid level measuring step (S80$b$) of using, by the central processing unit, the initial liquid level information remaining after excluding the initial liquid level information in the correcting step (S60$b$) to calculate final liquid level information; and a final validity determining step (S90$b$) of determining, by the central processing unit, the validity of the final liquid level information calculated in the liquid level measuring step (S80$b$), depending on the number of initial liquid level information excluded from the plurality of initial liquid level information in the correcting step (S60$b$).

The central processing unit may determine that the calculated final liquid level information is invalid liquid level information when the number of initial liquid level information excluded from the plurality of initial liquid level information is equal to or more than half and the method may further include a displaying step of transmitting the liquid level information to a display unit and displaying the liquid level information on the display unit to enable a vehicle driver to recognize accuracy of the liquid level information depending on the validity of the liquid level information determined.

When the number of aligned initial liquid level information remaining after excluding the initial liquid level information corresponding to a preset reference value or less or zero from the plurality of initial liquid level information is odd, the central processing unit may calculate final liquid level information as an intermediate value, and when the number of aligned initial liquid level information remaining after excluding the initial liquid level information corresponding to a preset reference value or less or zero from the plurality of initial liquid level information is even, the central processing unit may calculate the final liquid level information as the average value of the intermediate two initial liquid level information.

After final liquid level information is calculated, the central processing unit may perform a step of removing one measurement data first received from the plurality of measurement data received and then a step of receiving one new measurement data, and then repeatedly perform the removing and receiving operations.

In another general aspect, a method for measuring a liquid level of a vehicle fuel tank including an ultrasonic sensor unit provided on a bottom surface in the vehicle fuel tank to acquire and transmit measurement data for calculating a distance from the bottom surface in the fuel tank to a fuel surface, the method includes: a first validity determining step (S10$c$) of using, by a central processing unit, a ringing time acquired when the ultrasonic sensor unit transmits an ultrasonic wave to determine validity of measurement data transmitted from the ultrasonic sensor unit; a measuring step (S20$c$) of receiving, by the central processing unit, the plurality of measurement data transmitted from the ultrasonic sensor unit by a preset number of times for a preset time; an aligning step (S40$c$) of using, by the central processing unit, the plurality of measurement data received in the measuring step (S20$c$) to calculate a plurality of initial liquid level information and aligning the plurality of initial liquid level information in an ascending order or a descending order; a correcting step (S60$c$) of excluding, by the central processing unit, initial liquid level information corresponding to a preset reference value or less or zero from the plurality of initial liquid level information aligned in the aligning step (S40$c$): a liquid level measuring step (S80$c$) of using, by the central processing unit, the initial liquid level information remaining after excluding the initial liquid level information in the correcting step (S60$c$) to calculate final liquid level information; and a final validity determining step (S90$c$) of determining, by the central processing unit, the validity of the final liquid level information calculated in the liquid level measuring step (S80$c$), depending on the number of initial liquid level information excluded from the plurality of initial liquid level information in the correcting step (S60$c$).

The central processing unit may use a ringing time acquired when the ultrasonic sensor unit transmits an ultrasonic wave to determine the measurement data transmitted from the ultrasonic sensor unit as valid measurement data if the ringing time is equal to or greater than a preset threshold, and the method may further include a displaying step of transmitting the liquid level information to a display unit and displaying the liquid level information on the display unit to enable a vehicle driver to recognize accuracy of the liquid level information depending on validity of the measurement data determined.

The central processing unit may determine that the calculated final liquid level information is invalid liquid level information when the number of initial liquid level information excluded from the plurality of initial liquid level information is equal to or more than half and the method may further include a displaying step of transmitting the liquid level information to a display unit and displaying the liquid level information on the display unit to enable a vehicle driver to recognize accuracy of the liquid level information, depending on the validity of the measurement data determined.

When the number of aligned initial liquid level information remaining after excluding the initial liquid level information corresponding to a preset reference value or less or zero from the plurality of initial liquid level information is odd, the central processing unit may calculate final liquid level information as an intermediate value, and when the number of aligned initial liquid level information remaining after excluding the initial liquid level information corresponding to a preset reference value or less or zero from the plurality of initial liquid level information is even, the central processing unit may calculate the final liquid level information as an average value of the intermediate two initial liquid level information.

After the final liquid level information is calculated, the central processing unit may perform a step of removing one measurement data first received from the plurality of measurement data received and then a step of receiving one new measurement data, and then repeatedly perform the removing and receiving operations.

In another general aspect, a method for measuring a liquid level of a vehicle fuel tank including an ultrasonic sensor unit provided on a bottom surface in the vehicle fuel tank to acquire and transmit measurement data for calculating a distance from the bottom surface in the fuel tank to a fuel surface, the method includes: a first validity determining step (S100a) of using, by a central processing unit, a ringing time acquired when the ultrasonic sensor unit transmits an ultrasonic wave to determine validity of measurement data transmitted from the ultrasonic sensor unit; a measuring step (S200a) of receiving, by the central processing unit, the plurality of measurement data transmitted from the ultrasonic sensor unit by a preset number of times for a preset time; a correcting step (S400a) of using, by the central processing unit, the plurality of measurement data received in the measuring step (S200a) to calculate a plurality of initial liquid level information and excluding initial liquid level information corresponding to a preset reference value or less or zero from the plurality of initial liquid level information; an aligning step (S600a) of aligning, by the central processing unit, the initial liquid level information remaining after excluding the initial liquid level information in the correcting step (S400a) in an ascending order or a descending order; and a liquid level measuring step (S800a) of using, by the central processing unit, the initial liquid level information aligned in the aligning step (S600a) to calculate final liquid level information.

The central processing unit may use a ringing time acquired when the ultrasonic sensor unit transmits an ultrasonic wave to determine the measurement data transmitted from the ultrasonic sensor unit as valid measurement data if the ringing time is equal to or greater than a preset threshold, and the method may further include a displaying step of transmitting the liquid level information to a display unit and displaying the liquid level information on the display unit to enable a vehicle driver to recognize accuracy of the liquid level information depending on the validity of the measurement data determined.

When the number of aligned initial liquid level information remaining after excluding the initial liquid level information corresponding to a preset reference value or less or zero from the plurality of initial liquid level information is odd, the central processing unit may calculate final liquid level information as an intermediate value, and when the number of aligned initial liquid level information remaining after excluding the initial liquid level information corresponding to a preset reference value or less or zero from the plurality of initial liquid level information is even, the central processing unit may calculate the final liquid level information as the average value of the intermediate two initial liquid level information.

After the final liquid level information is calculated, the central processing unit may perform a step of removing one measurement data first received from the plurality of measurement data received and then a step of receiving one new measurement data, and then repeatedly perform the removing and receiving operations.

In another general aspect, a method for measuring a liquid level of a vehicle fuel tank including an ultrasonic sensor unit provided on a bottom surface in the vehicle fuel tank to acquire and transmit measurement data for calculating a distance from the bottom surface in the fuel tank to a fuel surface, the method includes: a measuring step (S200b) of receiving, by the central processing unit, the plurality of measurement data transmitted from the ultrasonic sensor unit by a preset number of times for a preset time; a correcting step (S400b) of using, by the central processing unit, the plurality of measurement data received in the measuring step (S200b) to calculate a plurality of initial liquid level information and excluding initial liquid level information corresponding to a preset reference value or less or zero from the plurality of initial liquid level information; an aligning step (S600b) of aligning, by the central processing unit, the initial liquid level information remaining after excluding the initial liquid level information in the correcting step (S400b) in an ascending order or a descending order; a liquid level measuring step (S800b) of using, by the central processing unit, the initial liquid level information aligned in the aligning step (S600b) to calculate final liquid level information; and a final validity determining step (S900b) of determining, by the central processing unit, the validity of the final liquid level information calculated in the liquid level measuring step (S800b), depending on the number of initial liquid level information excluded from the plurality of initial liquid level information in the correcting step (S400b).

The central processing unit may determine that the calculated final liquid level information is invalid liquid level information when the number of initial liquid level information excluded from the plurality of initial liquid level information is equal to or more than half and the method may further include a displaying step of transmitting the liquid level information to a display unit and displaying the liquid level information on the display unit to enable a vehicle driver to recognize accuracy of the liquid level information depending on the validity of the measurement data determined.

When the number of aligned initial liquid level information remaining after excluding the initial liquid level information corresponding to a preset reference value or less or zero from the plurality of initial liquid level information is odd, the central processing unit may calculate final liquid level information as an intermediate value, and when the number of aligned initial liquid level information remaining after excluding the initial liquid level information corresponding to a preset reference value or less or zero from the plurality of initial liquid level information is even, the central processing unit may calculate the final liquid level information as the average value of the intermediate two initial liquid level information.

After the final liquid level information is calculated, the central processing unit may perform a step of removing one measurement data first received from the plurality of measurement data received and then a step of receiving one new measurement data, and then repeatedly perform the removing and receiving operations.

In another general aspect, a method for measuring a liquid level of a vehicle fuel tank including an ultrasonic sensor unit provided on a bottom surface in the vehicle fuel tank to acquire and transmit measurement data for calculating a distance from the bottom surface in the fuel tank to a fuel surface, the method includes: a first validity determining step (S100c) of using, by a central processing unit, a ringing time acquired when the ultrasonic sensor unit transmits an ultrasonic wave to determine validity of measurement data transmitted from the ultrasonic sensor unit; a measuring step (S200c) of receiving, by the central processing unit, the plurality of measurement data transmitted from the ultrasonic sensor unit by a preset number of times for a preset time; a correcting step (S400c) of using, by the central processing unit, the plurality of measurement data received in the measuring step (S200c) to calculate a plurality of initial liquid level information and excluding initial liquid level information corresponding to a preset reference value or less or zero from the plurality of initial liquid level information; an aligning step (S600c) of aligning, by the central processing unit, the initial liquid level information remaining after excluding the initial liquid level information in the correcting step (S400c) in an ascending order or a descending order; a liquid level measuring step (S800c) of using, by the central processing unit, the initial liquid level information aligned in the aligning step (S600c) to calculate final liquid level information; and a final validity determining step (S900c) of determining, by the central processing unit, the validity of the final liquid level information calculated in the liquid level measuring step (S800c), depending on the number of initial liquid level information excluded from the plurality of initial liquid level information in the correcting step (S400c).

In the method for measuring a liquid level of a vehicle fuel tank, the central processing unit may use a ringing time acquired when the ultrasonic sensor unit transmits an ultrasonic wave to determine the measurement data transmitted from the ultrasonic sensor unit as valid measurement data if the ringing time is equal to or greater than a preset threshold, and the method may further include transmitting the liquid level information to a display unit and displaying the liquid level information on the display unit to enable a vehicle driver to recognize accuracy of the liquid level information depending on the validity of the measurement data determined, and the central processing unit may determine that the calculated final liquid level information is invalid liquid level information when the number of initial liquid level information excluded from the plurality of initial liquid level information is equal to or more than half and the method may further include transmitting the liquid level information to a display unit and displaying the liquid level information on the display unit to enable a vehicle driver to recognize accuracy of the liquid level information depending on the validity of the liquid level information determined.

When the number of aligned initial liquid level information remaining after excluding the initial liquid level information corresponding to a preset reference value or less or zero from the plurality of initial liquid level information is odd, the central processing unit may calculate final liquid level information as an intermediate value, and when the number of aligned initial liquid level information remaining after excluding the initial liquid level information corresponding to a preset reference value or less or zero from the plurality of initial liquid level information is even, the central processing unit may calculate the final liquid level information as the average value of the intermediate two initial liquid level information.

After the final liquid level information is calculated, the central processing unit may perform a step of removing one measurement data first received from the plurality of measurement data received and then a step of receiving one new measurement data, and then repeatedly perform the removing and receiving operations.

Other features and aspects will be apparent from the following detailed description, the drawings, and the claims.

DETAILED DESCRIPTION OF MAIN ELEMENTS

Figure 1:
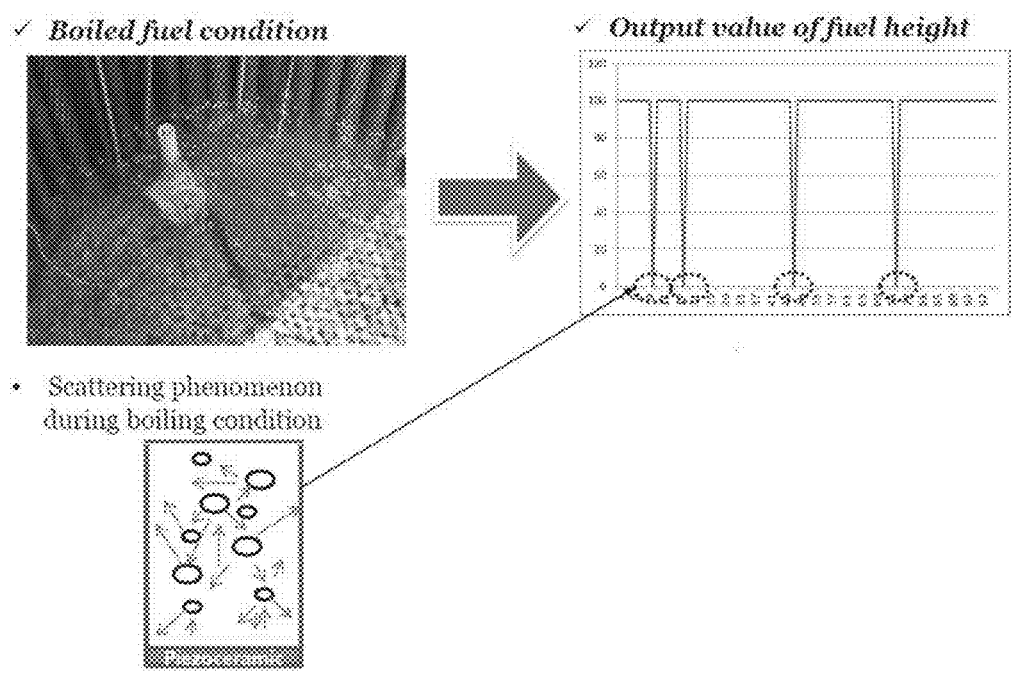
FIG. 1 is a graph showing bubbles generated in a fuel tank, an example of a diffused reflection or scattering phenomenon of an ultrasonic signal due to the bubbles, and a liquid level measurement error due to the phenomenon.

100: Ultrasonic sensor unit
110: Reference sensor 120: Measurement sensor
200: Central processing unit
210: First validity determination unit 220: Liquid level calculation unit
230: Second validity determination unit
300: Display unit
310: Liquid level output put 320: System warning unit
330: Fuel warning unit

DETAILED DESCRIPTION OF EMBODIMENTS

Hereinafter, a system and a method for measuring a liquid level of a vehicle fuel tank according to an exemplary embodiment of the present invention will be described in detail with reference to the accompanying drawings. The following introduced drawings are provided by way of example so that the idea of the present invention can be sufficiently transferred to those skilled in the art to which the present invention pertains. Therefore, the present invention is not limited to the accompanying drawings to be provided below, but may be implemented in other forms. In addition, like reference numerals denote like elements throughout the specification.

Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

In addition, the system means a set of components including apparatuses, mechanisms, units, etc. which are organized and regularly interact with each other to perform required functions.

A system and method for measuring a liquid level of a vehicle fuel tank according to the present invention relates to a system and a method for measuring a liquid level of a vehicle fuel tank using an ultrasonic sensor.

At this point, if fuel in the fuel tank boils in the high temperature environment to generate bubbles, the ultrasonic sensor is not reflected properly due to a diffused reflection or scattering phenomenon due to the bubbles and thus the liquid level may not be measured accurately. To solve the above problem, a system and a method for measuring a liquid level sets a plurality of measurement data by the ultrasonic sensor by a preset number of times in one cycle and calculates the plurality of measurement data within one cycle by a predetermined calculation method to minimize a measurement error, thereby measuring the liquid level of the fuel in the fuel tank with high accuracy.

Figure 2:
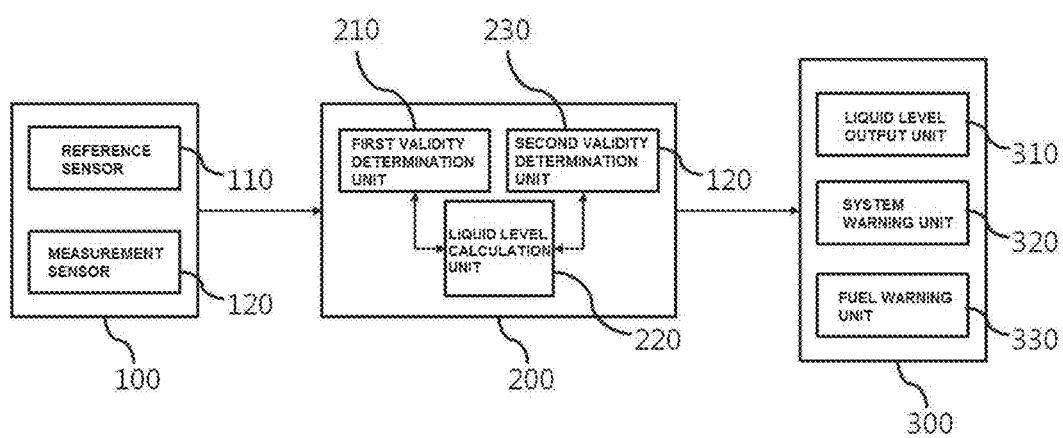
FIG. 2 is a view showing a configuration of a system for measuring a liquid level of a vehicle fuel tank according to an exemplary embodiment of the present invention.

FIG. 2 is a block diagram schematically showing a system for measuring a liquid level of a vehicle fuel tank according to an exemplary embodiment of the present invention. The system for measuring a liquid level of a vehicle fuel tank according to the exemplary embodiment of the present invention will be described in detail with reference to FIG. 2.

Figure 3:
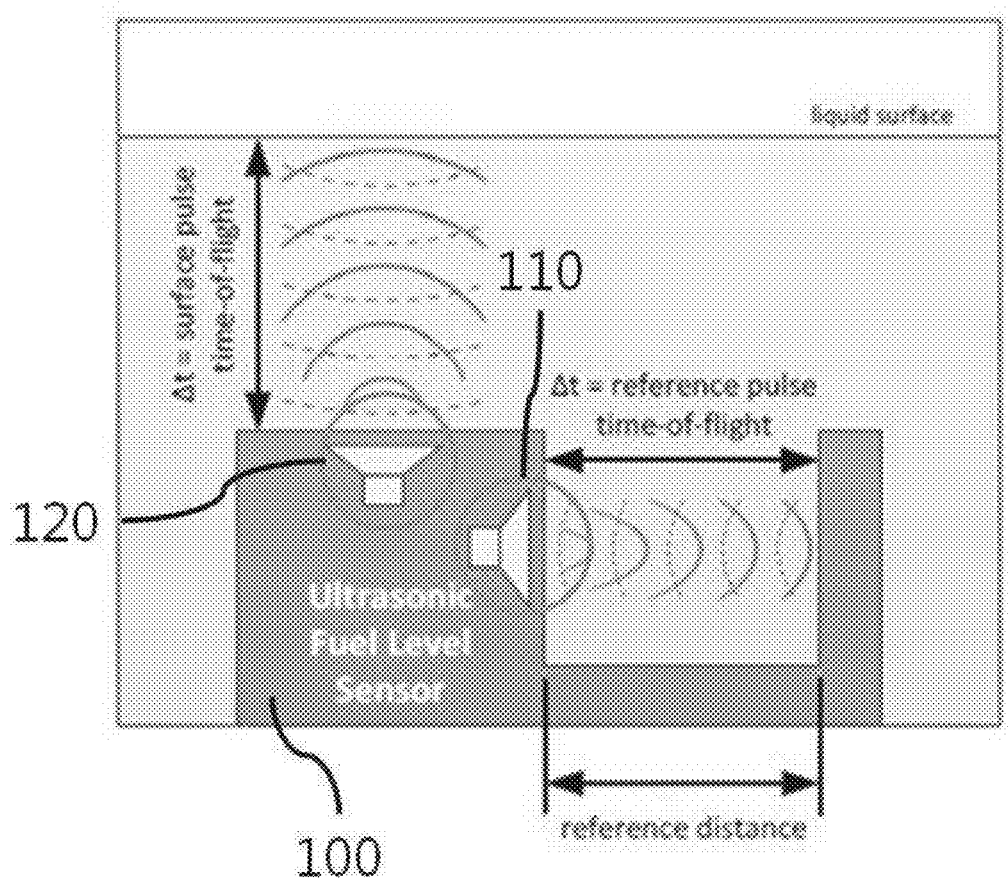
FIG. 3 is an exemplary view showing a configuration in which an ultrasonic sensor unit 100 of the system for measuring a liquid level of a vehicle fuel tank according to the exemplary embodiment of the present invention is provided on a bottom surface in the vehicle fuel tank.

As shown in FIG. 2, the system for measuring a liquid level of a vehicle fuel tank according to an exemplary embodiment of the present invention may include an ultrasonic sensor unit 100 and a central processing unit 200, in which the ultrasonic sensor unit 100 may preferably include a reference sensor 110 and a measurement sensor 120 as shown in FIG. 3.

The reference sensor 110 and the measurement sensor 120 of the ultrasonic sensor unit 100 may be configured of an oscillation unit for transmitting an ultrasonic signal and a response unit for receiving a reflected wave returning by reflection that may be configured integrally or separately.

Further, the ultrasonic sensor unit 100 may be preferably provided on the bottom surface in the vehicle fuel tank and submerged in fuel, thereby minimizing an error of the ultrasonic sensor itself due to air exposure.

Referring to each component in detail, the ultrasonic sensor unit 100 is an ultrasonic level sensor and is provided on the bottom surface in the vehicle fuel tank as described above to measure a distance by transmitting and receiving an ultrasonic signal on the bottom surface in the fuel tank and transmit the measurement data to the central processing unit 200.

In detail, since the transmitting and receiving speed of the ultrasonic signal is different depending on a kind, temperature or the like of fuel in the fuel tank, the reference sensor 100 is configured to set a reference therefor.

As shown in FIG. 3, the reference sensor 110 measures a time-of-flight reference (TOF Ref) on which time until the reflected signal of the transmitted ultrasonic signal returns by a reflection unit formed in advance is calculated. Thereby, the reference of the transmitting and receiving speed of the ultrasonic signal may be set depending on the fuel state of the fuel tank.

The measurement sensor 120 may acquire a time-of-flight surface level (TOF Lev.) for actually calculating the liquid level of the fuel tank. The time-of-flight surface level is data obtained by calculating the time until the ultrasonic signal is transmitted to a fuel surface of the fuel tank and a reflected signal reflected from the fuel surface (oil level) returns and may be calculated along with the time-of-flight reference acquired by the reference sensor 110 to calculate a distance from the bottom surface in the fuel tank to the fuel surface (oil surface).

The central processing unit 200 means an MCU which is a calculation means of a PCB provided in the vehicle, and the liquid level information of the fuel tank calculated by the central processing unit 200 is transmitted to a display unit 300 through CAN communication in a vehicle.

The central processing unit 200 may calculate the liquid level information of the fuel tank using the measurement data transmitted from the ultrasonic sensor unit 100 by a predetermined number of times for a preset time.

At this point, the liquid level information of the fuel tank is not only calculated, but the accuracy of the received time-of-flight reference and time-of-flight surface level may also be determined by predicting an error state (short or open) of the ultrasonic sensor unit 100. Further, it is possible to determine the accuracy of the liquid level information of the fuel tank calculated by predicting the current conditions of the fuel tank (bubble generation, inclined condition, state where oil supply is required, etc.).

Therefore, the display unit 300 not only outputs the fuel level information of the fuel tank transmitted from the central processing unit 200 so that a vehicle driver may check (identify) the fuel level information, but may also output the current accuracy of the system for measuring a liquid level of a vehicle fuel tank, thereby increasing the reliability of the liquid level information of the fuel tank currently being output.

The display unit 300 will be described later in detail.

The central processing unit 200 may include a first validity determination unit 210, a liquid level calculation unit 220, and a second validity determination unit 230.

As described above, the central processing unit 200 may perform the calculation process using the plurality of measurement data transmitted from the ultrasonic sensor unit 100 by a predetermined number of times for a preset time to calculate the liquid level information of the fuel in the fuel tank.

At this time, it is preferable that the preset time is set to be a time for continuously transmitting information of a flow rate remaining in the vehicle fuel tank to the vehicle driver, and the preset time according to the exemplary embodiment of the present invention is set to be 100 ms. However, this is only an exemplary embodiment of the present invention, and may be controlled.

Further, the preset number of times is preferably set to be 10 or so in consideration of responsiveness and a speed that may be processed by the ultrasonic level sensor included in the ultrasonic sensor unit 100. According to the exemplary embodiment of the present invention, the preset number of times is 8 and the measurement time of one measurement data is set to be 12.5 ms to receive 8 measurement data within 100 ms. The predetermined number of times within 10 is only an exemplary embodiment of the present invention, and may be controlled depending on the performance of the ultrasonic sensor.

The first validity determination unit 210 of the central processing unit 200 may determine the validity of the measurement data transmitted from the ultrasound sensor unit 100 and the second validity determination unit 230 may determine the validity of the liquid level information of the fuel tank calculated by the liquid level calculation unit 220.

In detail, the first validity determination unit 210 may acquire the ringing time generated when the ultrasonic signal is transmitted from the reference sensor 110 and determine the validity of the time-of-flight reference of the reference sensor 110 using the acquired ringing time, and acquire the ringing time generated when the measurement sensor 120 transmits the ultrasonic signal and determine the validity of the time-of-flight surface level of the measurement sensor 120 using the acquired ringing time.

Figure 4:
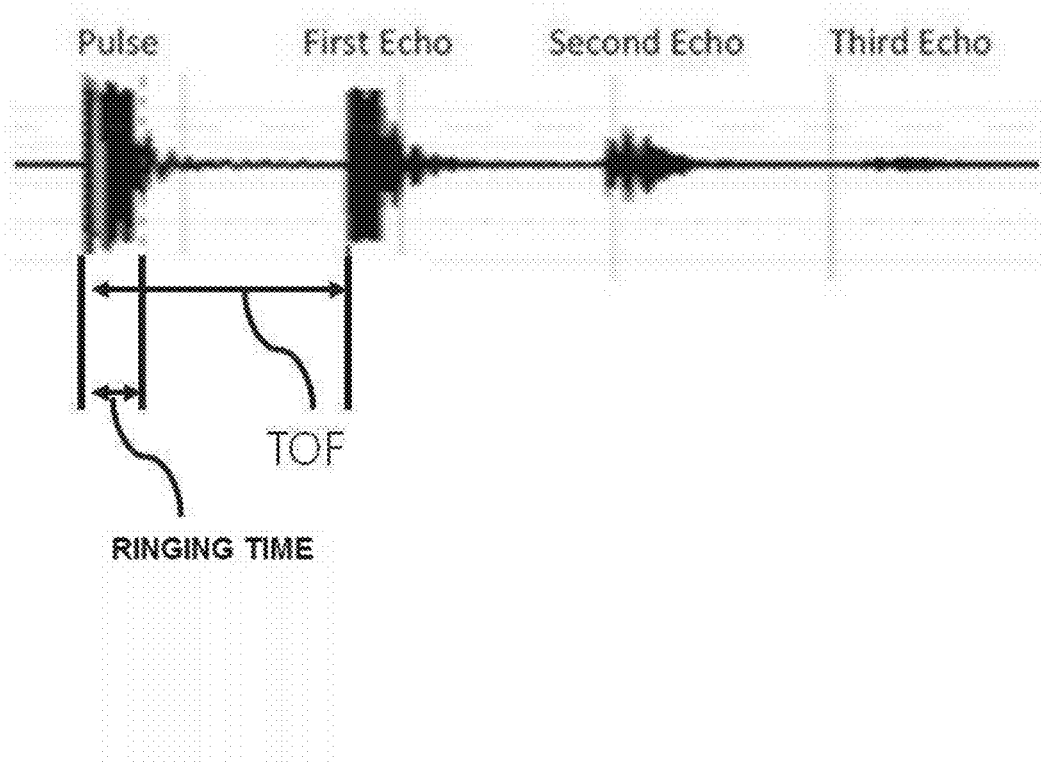
FIG. 4 is a graph showing an operation signal of the ultrasonic sensor unit 100 of the system for measuring a liquid level of a vehicle fuel tank according to the exemplary embodiment of the present invention.

That is, as shown in FIG. 4, the ringing time is a pulse signal generated at the time of the initial oscillation, and it is determined that the time-of-flight reference of the reference sensor 110 or the time-of-flight surface level of the measurement sensor 120 is valid if the ringing time of the reference sensor 110 or the ringing time of the measurement sensor 120 is equal to or greater than a preset reference point (threshold).

Figure 5:
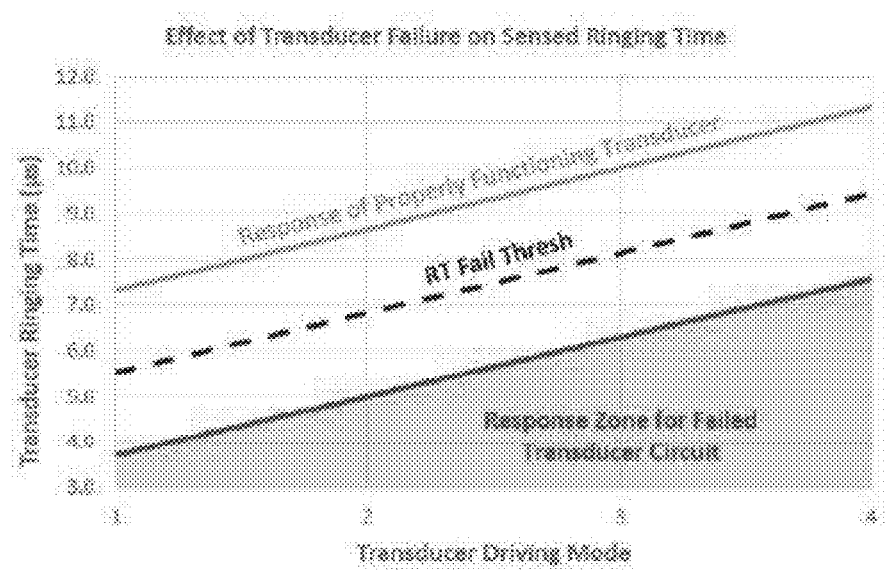
FIG. 5 is a graph showing a ringing time analysis process for determining validity of measurement data in a central processing unit 200 of the system for measuring a liquid level of a vehicle fuel tank according to the exemplary embodiment of the present invention.

In other words, as shown in FIG. 5, if the ringing time is equal to or less than a preset reference point, the reference sensor 110 or the measurement sensor 120 is self-diagnosed as having abnormality, and thus it is determined that the time-of-flight reference transmitted from the reference sensor 110 having the abnormality or the time-of-flight surface level transmitted from the measurement sensor 120 having the abnormality is not correct. In addition, the vehicle driver may recognize whether the liquid level information is accurate or not by the control of the display unit 300.

The liquid level calculation unit 220 may use the time-of-flight reference (TOF Ref.) transmitted from the reference sensor 110 and the time-of-flight surface level (TOF Lev.) transmitted from the measurement sensor 120 to calculate the liquid level information of the fuel tank.

As shown in FIG. 5, the measurement data of the reference sensor 110 or the measurement sensor 120 means the time until the first reflected signal returns, and is substituted into the following Equation, thereby calculating the liquid level information of the fuel tank.

Liquid level information=(reference distance)*(time-of-flight reference/time-of-flight surface level)

Here, the reference distance means the distance from the oscillation unit of the reference sensor 110 to the reflection unit formed in advance as illustrated in FIG. 3.

The reference sensor 110 may acquire the time-of-flight reference for the reference distance previously known, that is, the time until the ultrasonic signal is reflected by the reflection unit and returns to calculate the speed of the ultrasonic signal for the fuel (liquid) in the fuel tank.

The measurement sensor 120 may acquire the time-of-flight surface level, that is, the time until the ultrasonic signal is reflected by the surface (oil surface) and returns to calculate the liquid level information of the fuel tank.

As described above, the liquid level calculation unit 220 may calculate the liquid level information of the fuel tank by using the plurality of time-of-flight reference and time-of-flight surface level received by the preset number of times for a preset time.

In detail, the liquid level calculation unit 220 may calculate a plurality of initial liquid level information using the plurality of time-of-flight reference and time-of-flight surface level.

The plurality of calculated initial liquid level information is aligned in an ascending order or a descending order.

Thereafter, the initial liquid level information corresponding to a preset reference value or less or the initial liquid level information corresponding to zero is excluded from the plurality of aligned initial liquid level information.

If the number of initial liquid level information remaining after excluding the initial liquid level information is odd, the liquid level information is calculated as an intermediate value.

If the number of initial liquid level information remaining after excluding the initial liquid level information is even, the level information is calculated as an average value of the intermediate two measurement data.

At this point, the preset reference value is a data value larger than 0 and is preferably set to be a value of the measurement data to be disregarded among the measurement data which is the distance from the bottom surface in the fuel tank to the fuel surface (oil surface) that is measured by the ultrasonic sensor unit 100, and according to the exemplary embodiment of the present invention, the preset reference value is set to be only 0. This is merely one exemplary embodiment of the present invention and may be controlled depending on the performance of the ultrasonic sensor.

The calculation process by the liquid level calculation unit 220 of the central processing unit 200 will be described in more detail in the method for measuring a liquid level of a vehicle fuel tank to be described below.

In addition, if the calculated final liquid level information is equal to or less than the preset oil supply reference value, the liquid level calculation unit 320 is preferably configured so that the vehicle driver recognizes the necessity of oil supply by the control of the display unit 300 along with the current liquid level information of the fuel tank.

The second validity determination unit 230 may determine the validity of the liquid level information of the fuel tank calculated by the liquid level calculation unit 220 using the time-of-flight reference transmitted from the reference sensor 110 and the time-of-flight surface level transmitted from the measurement sensor 120.

In detail, the second validity determination unit 230 may preferably determine that if the initial liquid level information more than half among the plurality of initial liquid level information calculated by the liquid level calculation unit 220 using the plurality of time-of-flight references and the time-of-flight surface levels is equal to or less than the preset reference value or is equal to 0, that is, if the initial liquid level information excluded in the calculation process by the liquid level calculation unit 220 is equal to or greater than half of the initial liquid level information first calculated, the liquid level information of the fuel tank calculated by the liquid level calculation unit 220 is invalid.

In addition, like the first validity determination unit 210, the vehicle driver may recognize whether the liquid level information is accurate or not by the control of the display unit 300.

In this way, the system for measuring a liquid level of a vehicle fuel tank according to the exemplary embodiment of the present invention may further include the display unit 300 for outputting the liquid level information of the fuel tank transmitted from the central processing unit 200 to enable the vehicle driver to check the liquid level information.

The display unit 300 may include a liquid level output unit 310, a system warning unit 320, and a fuel warning unit 330.

The liquid level output unit 310 receives the liquid level information of the fuel tank calculated by the liquid level calculation unit 220 and outputs the information to enable the vehicle driver to check the liquid level information.

The liquid level output unit 310 outputs the liquid level information of the fuel tank calculated by the liquid level calculation unit 220 regardless of the determination results of the first validity determination unit 210 or the second validity determination unit 230.

For example, even if the first validity determination unit 210 determines the time-of-flight reference of the reference sensor 110 and the time-of-flight surface level of the measurement sensor 120 as the measurement data having abnormality, the liquid level calculation unit 220 calculates the liquid level information of the fuel tank.

The liquid level output unit 310 receives and outputs the calculated liquid level information.

However, an operation of the system warning unit 320 is controlled to notify the vehicle driver that the liquid level information is inaccurate.

In detail, the system warning unit 320 preferably outputs an alarm to enable the vehicle driver to recognize the inaccuracy of the current liquid level information if the first validity determination unit 210 diagnoses that the time-of-flight reference of the reference sensor 110 or the time-of-flight surface level of the measurement sensor 120 is abnormal and determines that the time-of-flight reference or the time-of-flight surface level is invalid.

Further, the system warning unit 320 preferably outputs an alarm to enable the vehicle driver to recognize the inaccuracy of the current liquid level information if the second validity determination unit 230 determines that the liquid level information of the fuel tank is invalid.

The fuel warning unit 330 preferably outputs an alarm to enable the vehicle driver to recognize the necessity of oil supply if the liquid level information of the fuel tank calculated by the liquid level calculation unit 220 corresponds to a preset oil supplying reference value or less.

First Exemplary Embodiment of Method

Figure 6:
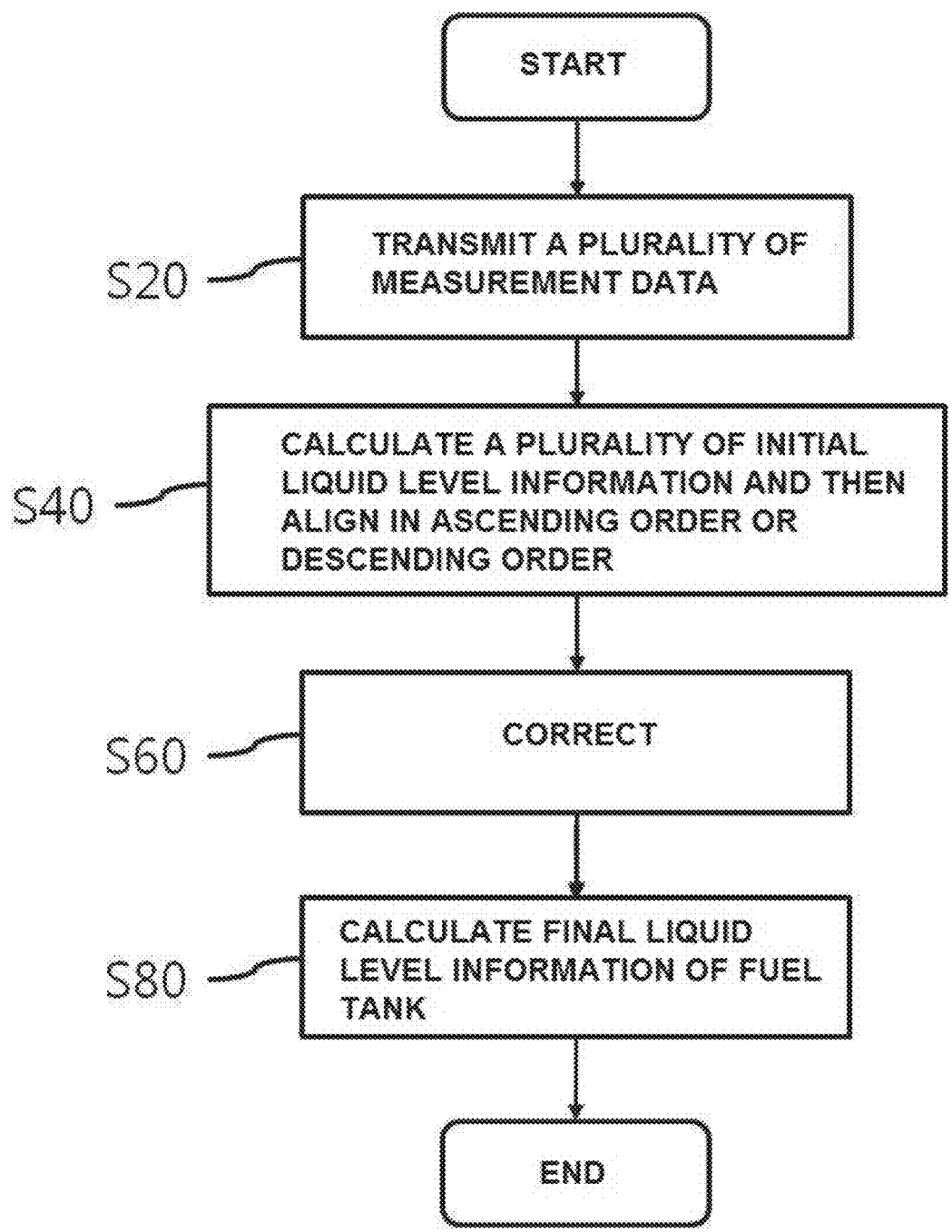
FIG. 6 is a flow chart showing a method for measuring a liquid level of a vehicle fuel tank according to a first exemplary embodiment of the present invention.

FIG. 6 is a flow chart showing a method for measuring a liquid level of a vehicle fuel tank according to a first exemplary embodiment of the present invention.

The method for measuring a liquid level of a vehicle fuel tank according to the first exemplary embodiment of the present invention will be described in detail with reference to FIG. 6.

As shown in FIG. 6, the method for measuring a liquid level of a vehicle fuel tank according to the first exemplary embodiment of the present invention includes a measuring step (S20), an aligning step (S40), a correcting step (S60), and a liquid level measuring step (S80).

Each step will be described below in detail.

In the measuring step (S20), the central processing unit 200 may receive the plurality of measurement data from the ultrasonic sensor unit 100.

As described above, the plurality of measurement data are the time-of-flight reference transmitted from the reference sensor 110 and time-of-flight surface level transmitted from the measurement sensor 120 by the preset number of times for the preset time in the ultrasonic sensor unit 100.

In the aligning step (S40), the central processing unit 200 uses the plurality of measurement data received in the measuring step (S20) to calculate the plurality of initial liquid level information and aligns the plurality of initial liquid level information in an ascending order or a descending order.

In the correcting step (S60), the central processing unit 200 excludes the initial liquid level information corresponding to the preset reference value or less or zero from the plurality of initial liquid level information aligned in an ascending order or a descending order in the aligning step (S40).

In the liquid level measuring step (S80), the central processing unit 200 uses the plurality of initial liquid level information remaining after excluding the initial liquid level information corresponding to the preset reference value or less or zero from the plurality of initial liquid level information aligned in the correcting step (S60) to calculate the final liquid level information of the fuel tank.

In other words, if the number of initial liquid level information remaining after excluding the initial liquid level information corresponding to the preset reference value or less or zero from the plurality of aligned initial liquid level information is odd, the final liquid level information of the fuel tank is calculated as the intermediate value.

If the number of initial liquid level information remaining after excluding the initial liquid level information corresponding to the preset reference value or less or zero from the plurality of aligned initial liquid level information is even, the final liquid level information of the fuel tank is calculated as the average value of the intermediate two measurement data.

For example, if the number of remaining initial liquid level information is 5, the final liquid level information is calculated as a third aligned initial liquid level information value.

If the number of remaining initial liquid level information is 4, the final liquid level information is calculated as an average value of second and third aligned initial liquid level information values.

In addition, the method for measuring a liquid level of a vehicle fuel tank according to the first exemplary embodiment of the present invention performs the liquid level measuring step (S80), and then transmits the calculated fuel liquid level information to the liquid level output unit 310 of the display unit 300 to enable the vehicle driver to easily check (recognize) the current remaining amount of fuel in the fuel tank.

In addition, in the method for measuring a liquid level of a vehicle fuel tank according to the first exemplary embodiment of the present invention, the liquid level measuring step (S80) is performed and then the central processing unit 200 repeatedly perform the measuring step (S20), the aligning step (S40), the correcting step (S60) and the liquid level measuring step (S80) to enable the vehicle driver to easily check the current remaining amount of fuel in the fuel tank in real time.

At this time, prior to repeatedly performing the above steps, the central processing unit 200 removes one measurement data first received from the plurality of measurement data received in the measuring step (S20), and then includes one new measurement data to pack a plurality of measurement data of a new cycle, thereby calculating the fuel liquid level information.

Figure 14:
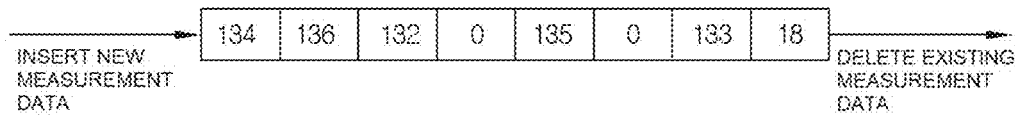
FIG. 14 is an exemplary view showing a calculation process of a method for measuring a liquid level of a vehicle fuel tank according to another exemplary embodiment of the present invention.

In more detail, FIG. 14 is an exemplary view showing that in step a) of FIG. 14, the central processing unit 200 uses the time-of-flight reference transmitted from the reference sensor 110 and the time-of-flight surface level transmitted from the measurement sensor 120 by the preset number of times for the preset time from the ultrasonic sensor unit 100 to calculate the plurality of initial liquid level information.

FIG. 14 is an exemplary view showing that in step b) of FIG. 14, the plurality of initial liquid level information calculated by the central processing unit 200 is aligned. As described above, two of the initial liquid level information that is zero are excluded.

FIG. 14 is an exemplary view showing that in step c) of FIG. 14, when the two of the initial liquid level information that is zero are excluded, since the number of remaining initial liquid level information is 6, that is, even, the final liquid level information of the fuel tank is calculated as the average value of the intermediate two initial liquid level information.

FIG. 14 is an exemplary view showing that in step d) of FIG. 14, in order to repeatedly calculate the liquid level information of the fuel tank, a plurality of initial liquid level information of a new cycle is packed prior to calculating new fuel liquid level information. That is, the method for measuring a liquid level of a vehicle fuel tank performs a step of removing one measurement data first received and then a step of receiving one new measurement data, and then repeatedly performs the removing and receiving steps.

Second Exemplary Embodiment of Method

Figure 7:
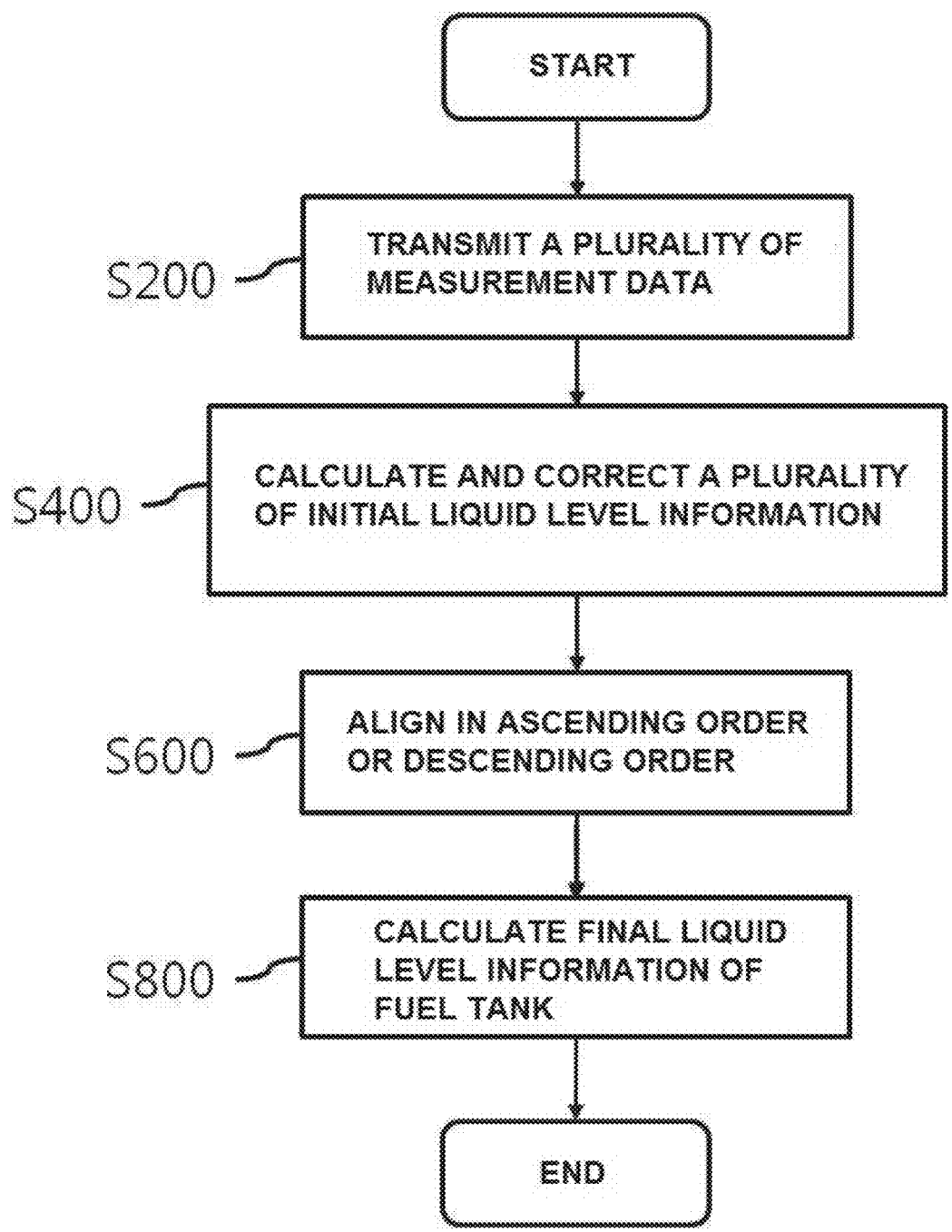
FIG. 7 is a flow chart showing a method for measuring a liquid level of a vehicle fuel tank according to a second exemplary embodiment of the present invention.

As shown in FIG. 7, the method for measuring a liquid level of a vehicle fuel tank according to the second exemplary embodiment of the present invention includes a measuring step (S200), a correcting step (S400), an aligning step (S600), and a liquid level measuring step (S800).

Each step will be described below in detail.

In the measuring step (S200), the central processing unit 200 may receive the plurality of measurement data from the ultrasonic sensor unit 100.

As described above, the plurality of measurement data are the time-of-flight reference transmitted from the reference sensor 110 and time-of-flight surface level transmitted from the measurement sensor 120 by the preset number of times for the preset time in the ultrasonic sensor unit 100.

In the correcting step (S400), the central processing unit 200 uses the plurality of measurement data received in the measuring step (S200) to calculate the plurality of initial liquid level information and excludes the initial liquid level information corresponding to the preset reference value or less or zero from the plurality of initial liquid level information.

In the aligning step (S600), the central processing unit 200 aligns the initial liquid level information remaining after excluding the initial liquid level information corresponding to the preset reference value or less or zero from the plurality of initial liquid level information in the correcting step (S400) in an ascending order or a descending order.

In the liquid level measuring step (S800), the central processing unit 200 uses the plurality of initial liquid level information aligned in the ascending order or the descending order in the aligning step (S600) to calculate the fuel liquid level information.

In detail, if the number of initial liquid level information remaining after excluding the initial liquid level information or the initial liquid level information corresponding to the preset reference value or less or zero from the plurality of initial liquid level information is odd, the final liquid level information is calculated as the intermediate value.

If the number of initial liquid level information remaining after excluding the initial liquid level information corresponding to the preset reference value or less or zero from the plurality of aligned initial liquid level information is even, the final liquid level information of the fuel tank is calculated as the average value of the intermediate two initial liquid level information.

For example, if the number of remaining initial liquid level information is 5, the final liquid level information is calculated as a third aligned initial liquid level information value.

If the number of remaining initial liquid level information is 4, the final liquid level information is calculated as an average value of second and third aligned initial liquid level information values.

In addition, the method for measuring a liquid level of a vehicle fuel tank according to the second exemplary embodiment of the present invention performs the liquid level measuring step (S800), and then transmits the calculated fuel liquid level information to the liquid level output unit 310 of the display unit 300 to enable the vehicle driver to easily check (recognize) the current remaining amount of fuel in the fuel tank.

In addition, the method for measuring a liquid level of a vehicle fuel tank according to the second exemplary embodiment of the present invention performs the liquid level measuring step (S800) and then the central processing unit 200 repeatedly performs the measuring step (S200), the correcting step (S400), the aligning step (S600) and the liquid level measuring step (S800) to enable the vehicle driver to easily check the current remaining amount of fuel in the fuel tank in real time.

At this time, prior to repeatedly performing the above steps, the central processing unit 200 removes one measurement data first received from the plurality of measurement data received in the measuring step (S200), and then includes one new measurement data to pack a plurality of measurement data of a new cycle, thereby calculating the fuel liquid level information.

Third Exemplary Embodiment of Method

Figure 8:
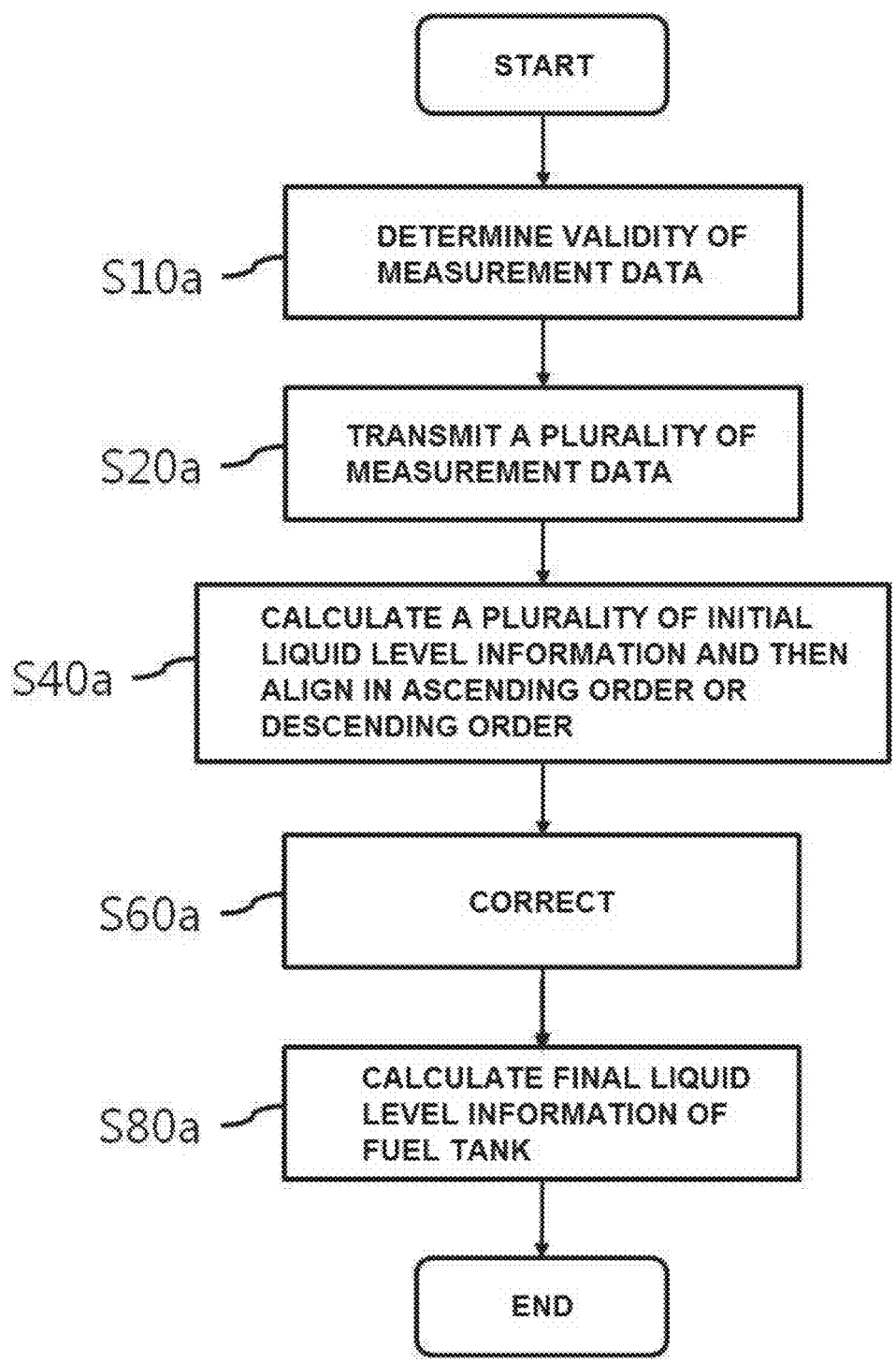
FIG. 8 is a flow chart showing a method for measuring a liquid level of a vehicle fuel tank according to a third exemplary embodiment of the present invention.

As shown in FIG. 8, the method for measuring a liquid level of a vehicle fuel tank according to a third exemplary embodiment of the present invention includes a first validity determining step (S10a), a measuring step (S20a), an aligning step (S40a), a correcting step (S60a), and a liquid level measuring step (S80a).

Each step will be described below in detail.

In the first validity determining step (S10a), the central processing unit 200 may use the ringing time obtained upon the ultrasonic transmission of the ultrasonic sensor unit 100 to determine the validity of the measurement data transmitted from the ultrasonic sensor unit 100.

In detail, the first validity determination unit 210 of the central processing unit 200 may acquire the ringing time generated when the ultrasonic signal is transmitted from the reference sensor 110 and determine the validity of the time-of-flight reference of the reference sensor 110 using the acquired ringing time, and acquire the ringing time generated when the measurement sensor 120 transmits the ultrasonic signal and determine the validity of the time-of-flight surface level of the measurement sensor 120 using the acquired ringing time.

The ringing time is a pulse signal generated at the time of the initial oscillation, and it is determined that the time-of-flight reference of the reference sensor 110 or the time-of-flight surface level of the measurement sensor 120 is valid if the ringing time of the reference sensor 110 or the ringing time of the measurement sensor 120 is equal to or greater than a preset reference point (threshold).

In other words, as shown in FIG. 5, if the ringing time is equal to or less than a preset reference point, the reference sensor 110 or the measurement sensor 120 is self-diagnosed as having abnormality, and thus it is determined that the time-of-flight reference transmitted from the reference sensor 110 having the abnormality or the time-of-flight surface level transmitted from the measurement sensor 120 having the abnormality is not correct.

The method for measuring a liquid level of a vehicle fuel tank according to the third exemplary embodiment of the present invention preferably calculates the liquid level information of the fuel tank and outputs the calculated liquid level information to the vehicle driver, irrespectively of the determination result of the first validity determining step (S10a).

In the measuring step (S20a), the central processing unit 200 may receive the plurality of measurement data from the ultrasonic sensor unit 100.

As described above, the plurality of measurement data are the time-of-flight reference transmitted from the reference sensor 110 and time-of-flight surface level transmitted from the measurement sensor 120 by the preset number of times for the preset time in the ultrasonic sensor unit 100.

In the aligning step (S40a), the central processing unit 200 uses the plurality of measurement data received in the measuring step (S20a) to calculate the plurality of initial liquid level information and aligns the plurality of initial liquid level information in an ascending order or a descending order.

In the correcting step (S60a), the central processing unit 200 excludes the initial liquid level information corresponding to the preset reference value or less or zero from the plurality of initial liquid level information aligned in an ascending order or a descending order in the aligning step (S40a).

In the liquid level measuring step (S80a), the central processing unit 200 uses the plurality of initial liquid level information remaining after excluding the initial liquid level information corresponding to the preset reference value or less or zero from the plurality of initial liquid level information aligned in the correcting step (S60a) to calculate the final liquid level information of the fuel tank.

In detail, if the number of initial liquid level information remaining after excluding the initial liquid level information or the initial liquid level information corresponding to the preset reference value or less or zero from the plurality of aligned initial liquid level information is odd, the final liquid level information of the fuel tank is calculated as the intermediate value.

If the number of initial liquid level information remaining after excluding the initial liquid level information corresponding to the preset reference value or less or zero from the plurality of aligned initial liquid level information is even, the final liquid level information of the fuel tank is calculated as the average value of the intermediate two measurement data.

In addition, the method for measuring a liquid level of a vehicle fuel tank according to the third exemplary embodiment of the present invention performs the liquid level measuring step (S80a), and then transmits the calculated fuel liquid level information to the liquid level output unit 310 of the display unit 300 to enable the vehicle driver to easily check (recognize) the current remaining amount of fuel in the fuel tank.

However, if the measurement data of the ultrasonic sensor unit 100 is determined to be inaccurate in the first validity determining step (S10a), the method further includes a first displaying step of controlling the system warning unit 320 of the display unit 300 to display the inaccuracy of the liquid level information along with the calculated liquid level information of the fuel tank so that the vehicle driver may recognize the inaccuracy of the liquid level information.

In addition, the method for measuring a liquid level of a vehicle fuel tank according to the third exemplary embodiment of the present invention performs the liquid level measuring step (S80a) and then allows the central processing unit 200 to repeatedly perform the first validity determining step (S10a), the measuring step (S20a), the aligning step (S40a), the correcting step (S60a) and the liquid level measuring step (S80a) to enable the vehicle driver to easily check the current remaining amount of fuel in the fuel tank in real time.

At this time, prior to repeatedly performing the above steps, the central processing unit 200 removes one measurement data first received from the plurality of measurement data received in the measuring step (S20a), and then includes one new measurement data to pack a plurality of measurement data of a new cycle, thereby calculating the fuel liquid level information.

Fourth Exemplary Embodiment of Method

Figure 9:
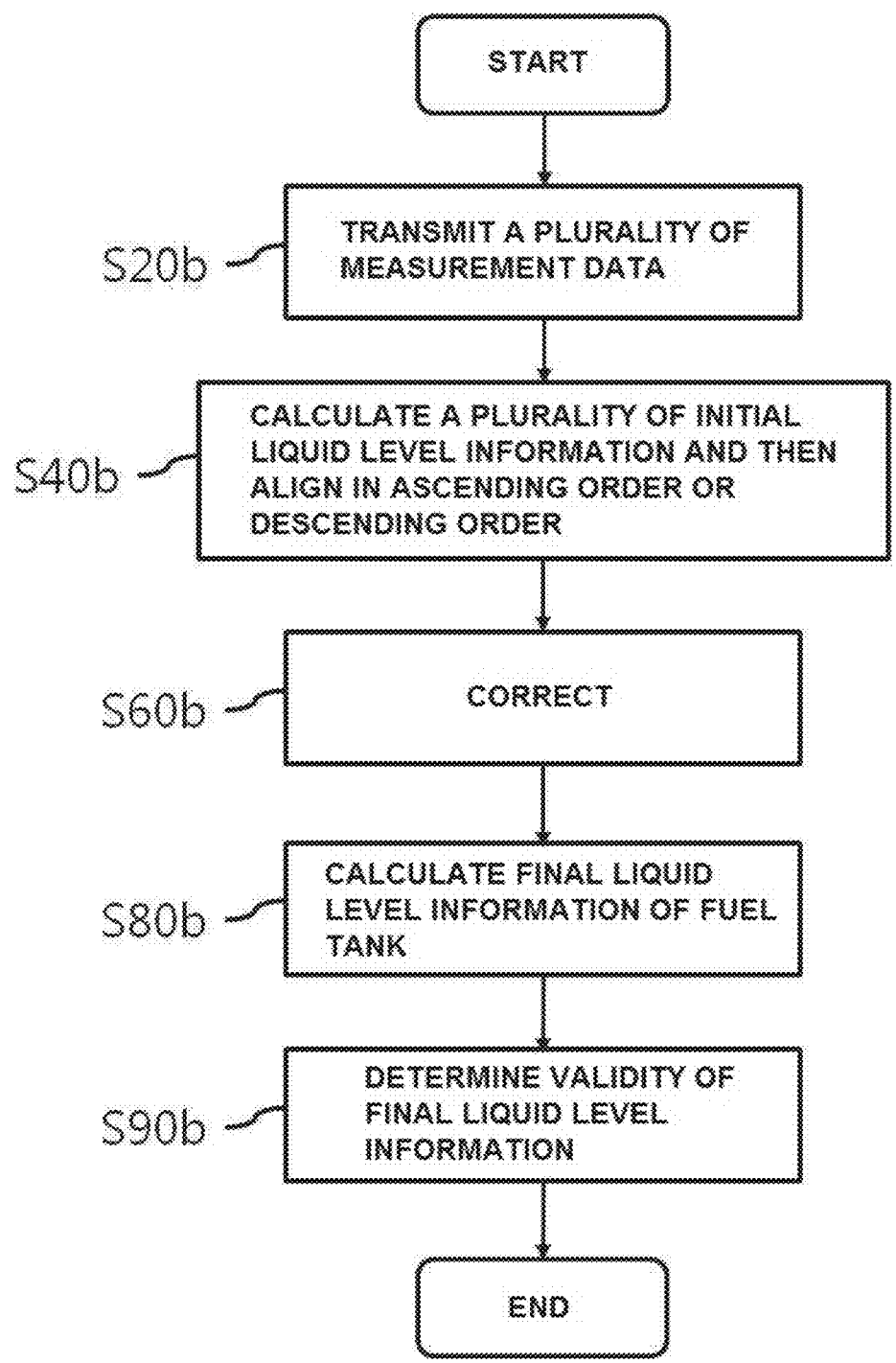
FIG. 9 is a flow chart showing a method for measuring a liquid level of a vehicle fuel tank according to a fourth exemplary embodiment of the present invention.

As shown in FIG. 9, the method for measuring a liquid level of a vehicle fuel tank according to a fourth exemplary embodiment of the present invention includes a measuring step (S20b), an aligning step (40b), a correcting step (S60b), a liquid level measuring step (S80b), and a final validity determining step (S90b).

Each step will be described below in detail.

In the measuring step (S20b), the central processing unit 200 may receive the plurality of measurement data from the ultrasonic sensor unit 100.

As described above, the plurality of measurement data are the time-of-flight reference transmitted from the reference sensor 110 and time-of-flight surface level transmitted from the measurement sensor 120 by the preset number of times for the preset time in the ultrasonic sensor unit 100.

In the aligning step (S40b), the central processing unit 200 uses the plurality of measurement data received in the measuring step (S20b) to calculate the plurality of initial liquid level information and aligns the plurality of initial liquid level information in an ascending order or a descending order.

In the correcting step (S60b), the central processing unit 200 excludes the initial liquid level information corresponding to the preset reference value or less or zero from the plurality of initial liquid level information aligned in an ascending order or a descending order in the aligning step (S40b).

In the liquid level measuring step (S80b), the central processing unit 200 uses the plurality of initial liquid level information remaining after excluding the initial liquid level information corresponding to the preset reference value or less or zero from the plurality of initial liquid level information aligned in the correcting step (S60b) to calculate the final liquid level information of the fuel tank.

In detail, if the number of initial liquid level information remaining after excluding the initial liquid level information corresponding to the preset reference value or less or zero from the plurality of aligned initial liquid level information is odd, the final liquid level information of the fuel tank is calculated as the intermediate value.

If the number of initial liquid level information remaining after excluding the initial liquid level information corresponding to the preset reference value or less or zero from the plurality of aligned initial liquid level information is even, the final liquid level information of the fuel tank is calculated as the average value of the intermediate two measurement data.

In the final validity determining step (S90b), the central processing unit 200 determines the validity of the final liquid level information calculated in the liquid level measuring step (S80b), depending on the number of initial liquid level information excluded from the plurality of initial liquid level information in the correcting step (S60b).

That is, in the final validity determining step (S90b), the second validity determination unit 230 of the central processing unit 200 preferably determines that the liquid level information of the fuel tank calculated by the liquid level calculation unit 220 is invalid if the initial liquid level information excluded in the correcting step (S60b) is more than half compared to the initial liquid level information first calculated.

In addition, the method for measuring a liquid level of a vehicle fuel tank according to the fourth exemplary embodiment of the present invention performs the liquid level measuring step (S80b), and then transmits the calculated fuel liquid level information to the liquid level output unit 310 of the display unit 300 to enable the vehicle driver to easily check (recognize) the current remaining amount of fuel in the fuel tank.

However, in the final validity determining step (S90b), if the final liquid level information calculated in the liquid level measuring step (S80b) is determined to be inaccurate, the method further includes a second displaying step of controlling the system warning unit 320 of the display unit 300 to display the inaccuracy of the liquid level information along with the calculated liquid level information of the fuel tank so that the vehicle driver may recognize the inaccuracy of the liquid level information.

In addition, the method for measuring a liquid level of a vehicle fuel tank according to the fourth exemplary embodiment of the present invention performs the final validity determining step (S90b) and then allows the central processing unit 200 to repeatedly perform the measuring step (S20b), the aligning step (S40b), the correcting step (S60b) and the liquid level measuring step (S80) to enable the vehicle driver to easily check the current remaining amount of fuel in the fuel tank in real time.

At this time, prior to repeatedly performing the above steps, the central processing unit 200 removes one measurement data first received from the plurality of measurement data received in the measuring step (S20b), and then includes one new measurement data to pack a plurality of measurement data of a new cycle, thereby calculating the fuel liquid level information.

Fifth Exemplary Embodiment of Method

Figure 10:
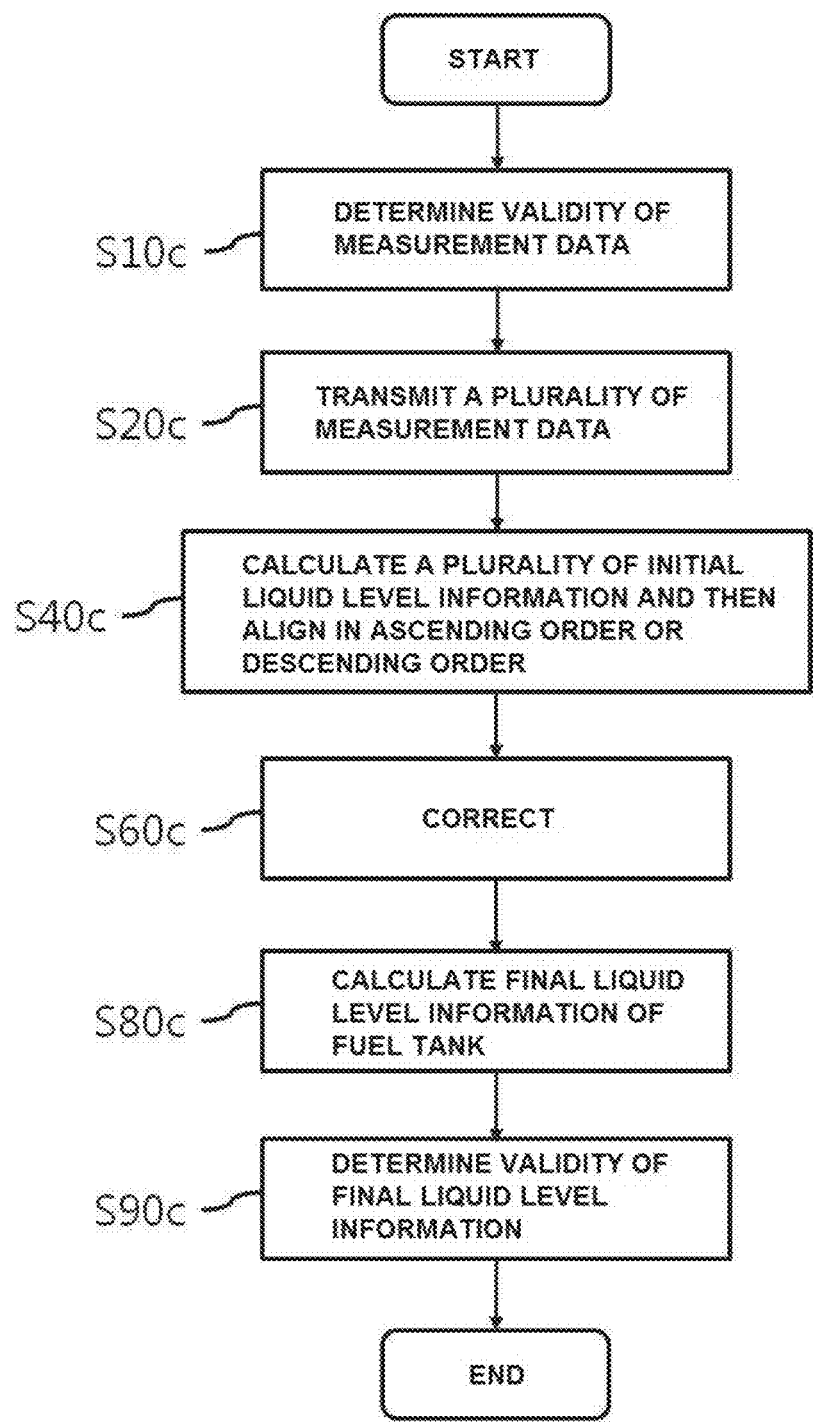
FIG. 10 is a flow chart showing a method for measuring a liquid level of a vehicle fuel tank according to a fifth exemplary embodiment of the present invention.

As shown in FIG. 10, the method for measuring a liquid level of a vehicle fuel tank according to a fifth exemplary embodiment of the present invention includes a first validity determining step (S10c), a measuring step (S20c), an aligning step (S40c), a correcting step (S60c), a liquid level measuring step (S80a), and a final validity determining step (S90c).

Each step will be described below in detail.

In the first validity determining step (S10c), the central processing unit 200 may use the ringing time obtained upon the ultrasonic transmission of the ultrasonic sensor unit 100 to determine the validity of the measurement data transmitted from the ultrasonic sensor unit 100.

In detail, the first validity determination unit 210 of the central processing unit 200 may acquire the ringing time generated when the ultrasonic signal is transmitted from the reference sensor 110 and determine the validity of the time-of-flight reference of the reference sensor 110 using the acquired ringing time, and acquire the ringing time generated when the measurement sensor 120 transmits the ultrasonic signal and determine the validity of the time-of-flight surface level of the measurement sensor 120 using the acquired ringing time.

The ringing time is a pulse signal generated at the time of the initial oscillation, and it is determined that the time-of-flight reference of the reference sensor 110 or the time-of-flight surface level of the measurement sensor 120 is valid if the ringing time of the reference sensor 110 or the ringing time of the measurement sensor 120 is equal to or greater than a preset reference point (threshold).

In other words, as shown in FIG. 5, if the ringing time is equal to or less than a preset reference point, the reference sensor 110 or the measurement sensor 120 is self-diagnosed as having abnormality, and thus it is determined that the time-of-flight reference transmitted from the reference sensor 110 having the abnormality or the time-of-flight surface level transmitted from the measurement sensor 120 having the abnormality is not correct.

The method for measuring a liquid level of a vehicle fuel tank according to the fifth exemplary embodiment of the present invention preferably calculates the liquid level information of the fuel tank and outputs the calculated liquid level information to the vehicle driver, irrespectively of the determination result of the first validity determining step (S10c).

In the measuring step (S20c), the central processing unit 200 may receive the plurality of measurement data from the ultrasonic sensor unit 100.

As described above, the plurality of measurement data are the time-of-flight reference transmitted from the reference sensor 110 and time-of-flight surface level transmitted from the measurement sensor 120 by the preset number of times for the preset time in the ultrasonic sensor unit 100.

In the aligning step (S40c), the central processing unit 200 uses the plurality of measurement data received in the measuring step (S20c) to calculate the plurality of initial liquid level information and aligns the plurality of initial liquid level information in an ascending order or a descending order.

In the correcting step (S60c), the central processing unit 200 excludes the initial liquid level information corresponding to the preset reference value or less or zero from the plurality of initial liquid level information aligned in an ascending order or a descending order in the aligning step (S40c).

In the liquid level measuring step (S80c), the central processing unit 200 uses the plurality of initial liquid level information remaining after excluding the initial liquid level information corresponding to the preset reference value or less or zero from the plurality of initial liquid level information aligned in the correcting step (S60c) to calculate the final liquid level information of the fuel tank.

In detail, if the number of initial liquid level information remaining after excluding the initial liquid level information or the initial liquid level information corresponding to the preset reference value or less or zero from the plurality of aligned initial liquid level information is odd, the final liquid level information of the fuel tank is calculated as the intermediate value.

If the number of initial liquid level information remaining after excluding the initial liquid level information corresponding to the preset reference value or less or zero from the plurality of aligned initial liquid level information is even, the final liquid level information of the fuel tank is calculated as the average value of the intermediate two measurement data.

In the final validity determining step (S90c), the central processing unit 200 determines the validity of the final liquid level information calculated in the liquid level measuring step (S80c), depending on the number of initial liquid level information excluded from the plurality of initial liquid level information in the correcting step (S60c).

That is, in the final validity determining step (S90c), the second validity determination unit 230 of the central processing unit 200 preferably determines that the liquid level information of the fuel tank calculated by the liquid level calculation unit 220 is invalid if the initial liquid level information excluded in the correcting step (S60c) is more than half compared to the initial liquid level information first calculated.

In addition, the method for measuring a liquid level of a vehicle fuel tank according to the fifth exemplary embodiment of the present invention performs the liquid level measuring step (S80c), and then transmits the calculated fuel liquid level information to the liquid level output unit 310 of the display unit 300 to enable the vehicle driver to easily check (recognize) the current remaining amount of fuel in the fuel tank.

However, if the measurement data of the ultrasonic sensor unit 100 is determined to be inaccurate in the first validity determining step (S10c), the method further includes a first displaying step of controlling the system warning unit 320 of the display unit 300 to display the inaccuracy of the liquid level information along with the calculated liquid level information of the fuel tank so that the vehicle driver may recognize the inaccuracy of the liquid level information.

However, in the final validity determining step (S90c), if the final liquid level information calculated in the liquid level measuring step (S80c) is determined to be inaccurate, the method further includes a second displaying step of controlling the system warning unit 320 of the display unit 300 to display the inaccuracy of the liquid level information along with the calculated liquid level information of the fuel tank so that the vehicle driver may recognize the inaccuracy of the liquid level information.

In addition, the method for measuring a liquid level of a vehicle fuel tank according to the fifth exemplary embodiment of the present invention performs the final validity determining step (S90c) and then allows the central processing unit 200 to repeatedly perform the first validity determining step (S10c), the measuring step (S20c), the aligning step (S40c), the correcting step (S60c), the liquid level measuring step (S80c), and the final validity determining step (S90c) to enable the vehicle driver to easily check the current remaining amount of fuel in the fuel tank in real time.

At this time, prior to repeatedly performing the above steps, the central processing unit 200 removes one measurement data first received from the plurality of measurement data received in the measuring step (S20c), and then includes one new measurement data to pack a plurality of measurement data of a new cycle, thereby calculating the fuel liquid level information.

Sixth Exemplary Embodiment of Method

Figure 11:
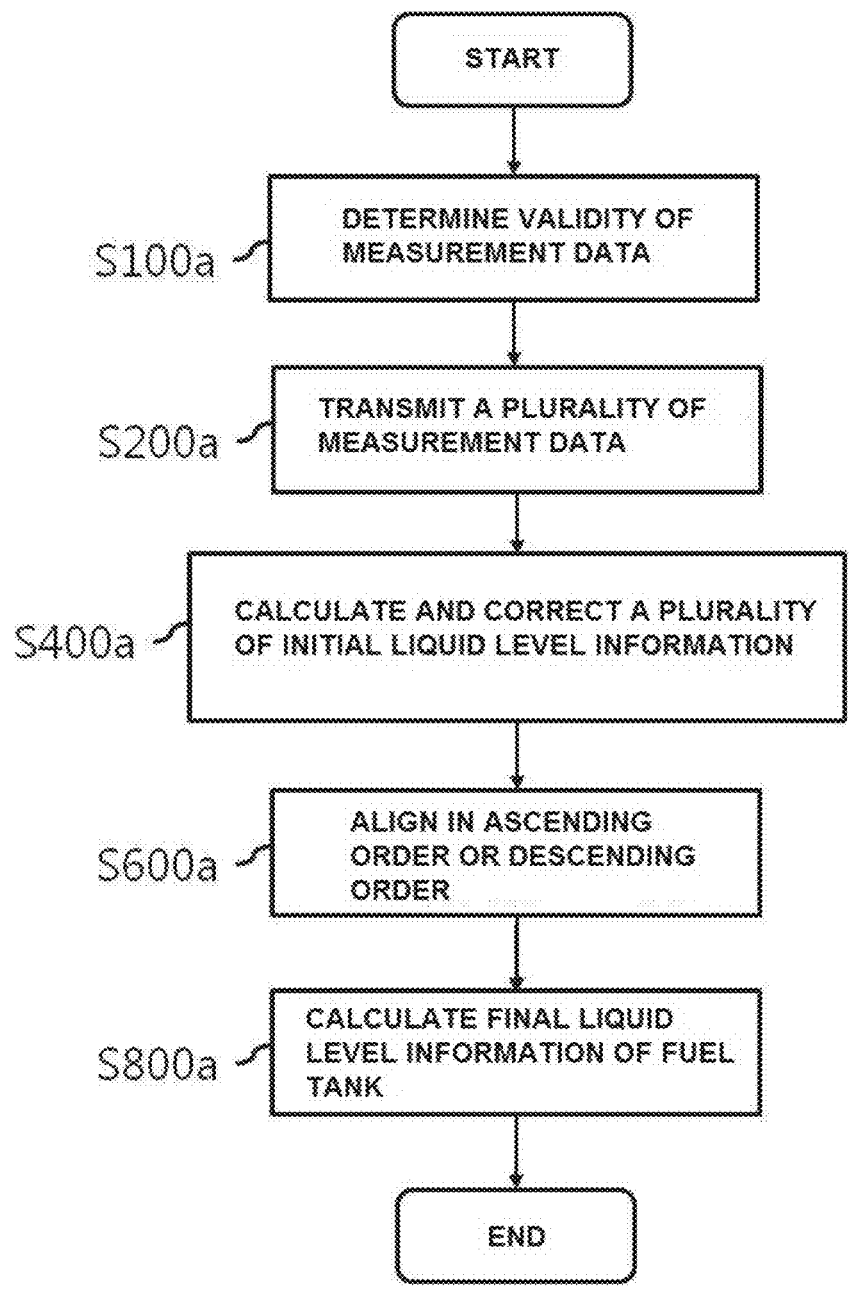
FIG. 11 is a flow chart showing a method for measuring a liquid level of a vehicle fuel tank according to a sixth exemplary embodiment of the present invention.

As shown in FIG. 11, the method for measuring a liquid level of a vehicle fuel tank according to a sixth exemplary embodiment of the present invention includes a first validity determining step (S100a), a measuring step (S200a), a correcting step (S400a), an aligning step (S600a), and a liquid level measuring step (S800a).

Each step will be described below in detail.

In the first validity determining step (S100a), the central processing unit 200 may use the ringing time obtained upon the ultrasonic transmission of the ultrasonic sensor unit 100 to determine the validity of the measurement data transmitted from the ultrasonic sensor unit 100.

In detail, the first validity determination unit 210 of the central processing unit 200 may acquire the ringing time generated when the ultrasonic signal is transmitted from the reference sensor 110 and determine the validity of the time-of-flight reference of the reference sensor 110 using the acquired ringing time, and acquire the ringing time generated when the measurement sensor 120 transmits the ultrasonic signal and determine the validity of the time-of-flight surface level of the measurement sensor 120 using the acquired ringing time.

The ringing time is a pulse signal generated at the time of the initial oscillation, and it is determined that the time-of-flight reference of the reference sensor 110 or the time-of-flight surface level of the measurement sensor 120 is valid if the ringing time of the reference sensor 110 or the ringing time of the measurement sensor 120 is equal to or greater than a preset reference point (threshold).

In other words, as shown in FIG. 5, if the ringing time is equal to or less than a preset reference point, the reference sensor 110 or the measurement sensor 120 is self-diagnosed as having abnormality, and thus it is determined that the time-of-flight reference transmitted from the reference sensor 110 having the abnormality or the time-of-flight surface level transmitted from the measurement sensor 120 having the abnormality is not correct.

The method for measuring a liquid level of a vehicle fuel tank according to the sixth exemplary embodiment of the present invention preferably calculates the liquid level information of the fuel tank and outputs the calculated liquid level information to the vehicle driver, irrespectively of the determination result of the first validity determining step (S100a).

In the measuring step (S200a), the central processing unit 200 may receive the plurality of measurement data from the ultrasonic sensor unit 100.

As described above, the plurality of measurement data are the time-of-flight reference transmitted from the reference sensor 110 and time-of-flight surface level transmitted from the measurement sensor 120 by the preset number of times for the preset time in the ultrasonic sensor unit 100.

In the correcting step (S400a), the central processing unit 200 uses the plurality of measurement data received in the measuring step (S200a) to calculate the plurality of initial liquid level information and excludes the initial liquid level information corresponding to the preset reference value or less or zero from the plurality of initial liquid level information.

In the aligning step (S600a), the central processing unit 200 aligns the initial liquid level information remaining after excluding the initial liquid level information corresponding to the preset reference value or less or zero from the plurality of initial liquid level information in the correcting step (S400a) in an ascending order or a descending order.

In the liquid level measuring step (S800a), the central processing unit 200 uses the plurality of initial liquid level information aligned in the ascending order or the descending order in the aligning step (S600a) to calculate the fuel liquid level information.

In detail, if the number of initial liquid level information remaining after excluding the initial liquid level information or the initial liquid level information corresponding to the preset reference value or less or zero from the plurality of initial liquid level information is odd, the final liquid level information is calculated as the intermediate value.

If the number of initial liquid level information remaining after excluding the initial liquid level information corresponding to the preset reference value or less or zero from the plurality of initial liquid level information is even, the final liquid level information of the fuel tank is calculated as the average value of the intermediate two initial liquid level information.

In addition, the method for measuring a liquid level of a vehicle fuel tank according to the sixth exemplary embodiment of the present invention performs the liquid level measuring step (S800a), and then transmits the calculated fuel liquid level information to the liquid level output unit 310 of the display unit 300 to enable the vehicle driver to easily check (recognize) the current remaining amount of fuel in the fuel tank.

However, if the measurement data of the ultrasonic sensor unit 100 is determined to be inaccurate in the first validity determining step (S100a), the method further includes a first displaying step of controlling the system warning unit 320 of the display unit 300 to display the inaccuracy of the liquid level information along with the calculated liquid level information of the fuel tank so that the vehicle driver may recognize the inaccuracy of the liquid level information.

In addition, the method for measuring a liquid level of a vehicle fuel tank according to the sixth exemplary embodiment of the present invention performs the liquid level measuring step (S800a) and then allows the central processing unit 200 to repeatedly perform the first validity determining step (S100a), the measuring step (S200a), the correcting step (S400a), the aligning step (S600a) and the liquid level measuring step (S800a) to enable the vehicle driver to easily check the current remaining amount of fuel in the fuel tank in real time.

At this time, prior to repeatedly performing the above steps, the central processing unit 200 removes one measurement data first received from the plurality of measurement data received in the measuring step (S200a), and then includes one new measurement data to pack a plurality of measurement data of a new cycle.

Seventh Exemplary Embodiment of Method

As shown in FIG. 11, the method for measuring a liquid level of a vehicle fuel tank according to a seventh exemplary embodiment of the present invention includes a measuring step (S200b), a correcting step (S400b), an aligning step (600b), a liquid level measuring step (S800b), and a final validity determining step (S900b).

In the measuring step (S200b), the central processing unit 200 may receive the plurality of measurement data from the ultrasonic sensor unit 100.

As described above, the plurality of measurement data are the time-of-flight reference transmitted from the reference sensor 110 and time-of-flight surface level transmitted from the measurement sensor 120 by the preset number of times for the preset time in the ultrasonic sensor unit 100.

In the correcting step (S400b), the central processing unit 200 uses the plurality of measurement data received in the measuring step (S200b) to calculate the plurality of initial liquid level information and excludes the initial liquid level information corresponding to the preset reference value or less or zero from the plurality of initial liquid level information.

In the aligning step (S600b), the central processing unit 200 aligns the initial liquid level information remaining after excluding the initial liquid level information corresponding to the preset reference value or less or zero from the plurality of initial liquid level information in the correcting step (S400b) in an ascending order or a descending order.

In the liquid level measuring step (S800b), the central processing unit 200 uses the plurality of initial liquid level information aligned in the ascending order or the descending order in the aligning step (S600b) to calculate the fuel liquid level information.

In detail, if the number of initial liquid level information remaining after excluding the initial liquid level information or the initial liquid level information corresponding to the preset reference value or less or zero from the plurality of initial liquid level information is odd, the final liquid level information is calculated as the intermediate value.

If the number of initial liquid level information remaining after excluding the initial liquid level information corresponding to the preset reference value or less or zero from the plurality of initial liquid level information is even, the final liquid level information of the fuel tank is calculated as the average value of the intermediate two initial liquid level information.

In the final validity determining step (S900b), the central processing unit 200 determines the validity of the final liquid level information calculated in the liquid level measuring step (S800b), depending on the number of initial liquid level information excluded from the plurality of initial liquid level information in the correcting step (S400b).

That is, in the final validity determining step (S900b), the second validity determination unit 230 of the central processing unit 200 preferably determines that the liquid level information of the fuel tank calculated by the liquid level calculation unit 220 is invalid if the initial liquid level information excluded in the correcting step (S400b) is more than half compared to the initial liquid level information first calculated.

In addition, the method for measuring a liquid level of a vehicle fuel tank according to the seventh exemplary embodiment of the present invention performs the liquid level measuring step (S800b), and then transmits the calculated fuel liquid level information to the liquid level output unit 310 of the display unit 300 to enable the vehicle driver to easily check (recognize) the current remaining amount of fuel in the fuel tank.

However, in the final validity determining step (S900b), if the final liquid level information calculated in the liquid level measuring step (S800b) is determined to be inaccurate, the method further includes a second displaying step of controlling the system warning unit 320 of the display unit 300 to display the inaccuracy of the liquid level information along with the calculated liquid level information of the fuel tank so that the vehicle driver may recognize the inaccuracy of the liquid level information.

In addition, the method for measuring a liquid level of a vehicle fuel tank according to the seventh exemplary embodiment of the present invention performs the final validity determining step (S900b) and then allows the central processing unit 200 to repeatedly perform the measuring step (S200b), the correcting step (S400b), the aligning step (S600b), the liquid level measuring step (S800b), and the final validity determining step (S900b) to enable the vehicle driver to easily check the current remaining amount of fuel in the fuel tank in real time.

At this time, prior to repeatedly performing the above steps, the central processing unit 200 removes one measurement data first received from the plurality of measurement data received in the measuring step (S200b), and then includes one new measurement data to pack a plurality of measurement data of a new cycle, thereby calculating the fuel liquid level information.

Eighth Exemplary Embodiment of Method

Figure 12:
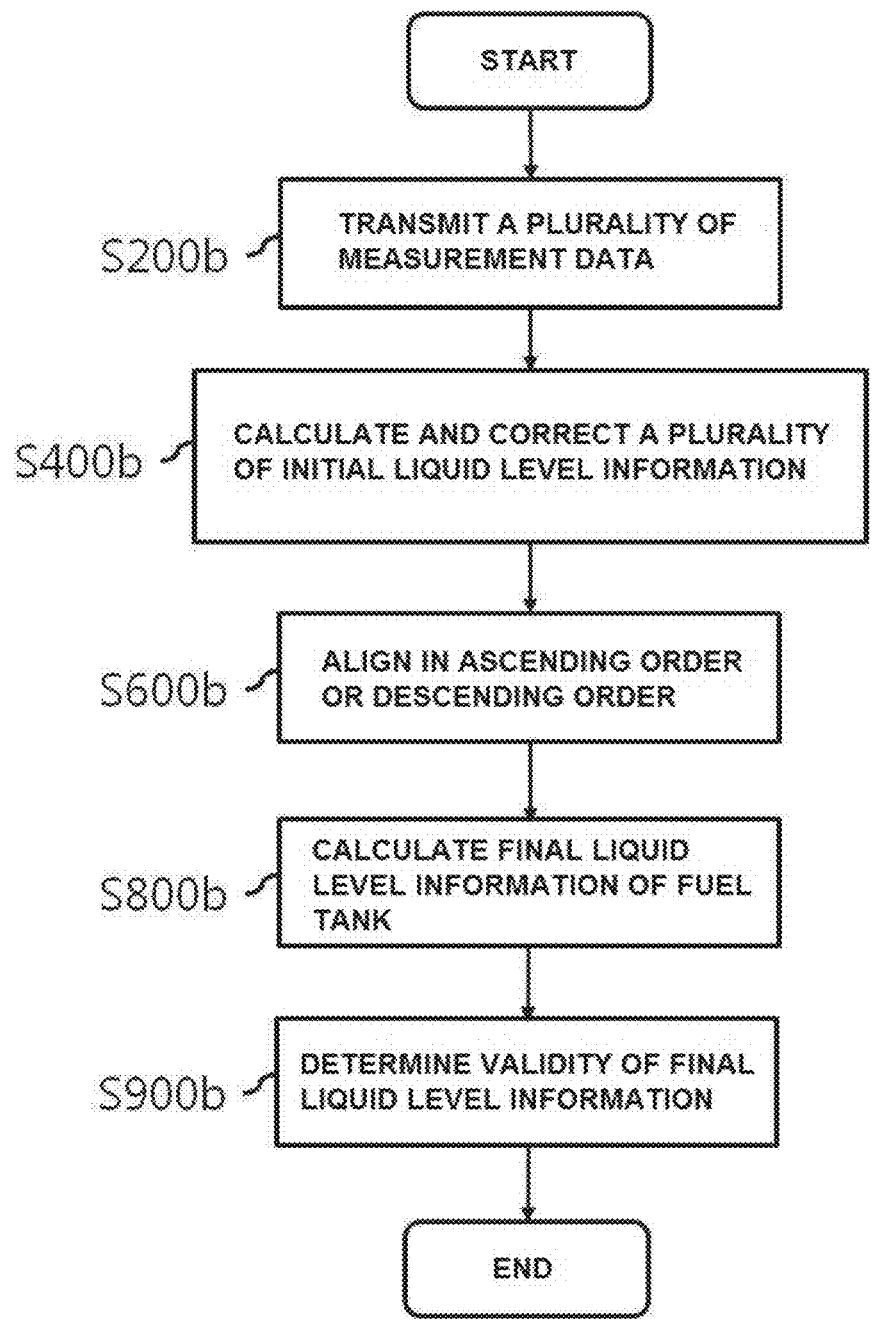
FIG. 12 is a flow chart showing a method for measuring a liquid level of a vehicle fuel tank according to a seventh exemplary embodiment of the present invention.
Figure 13:
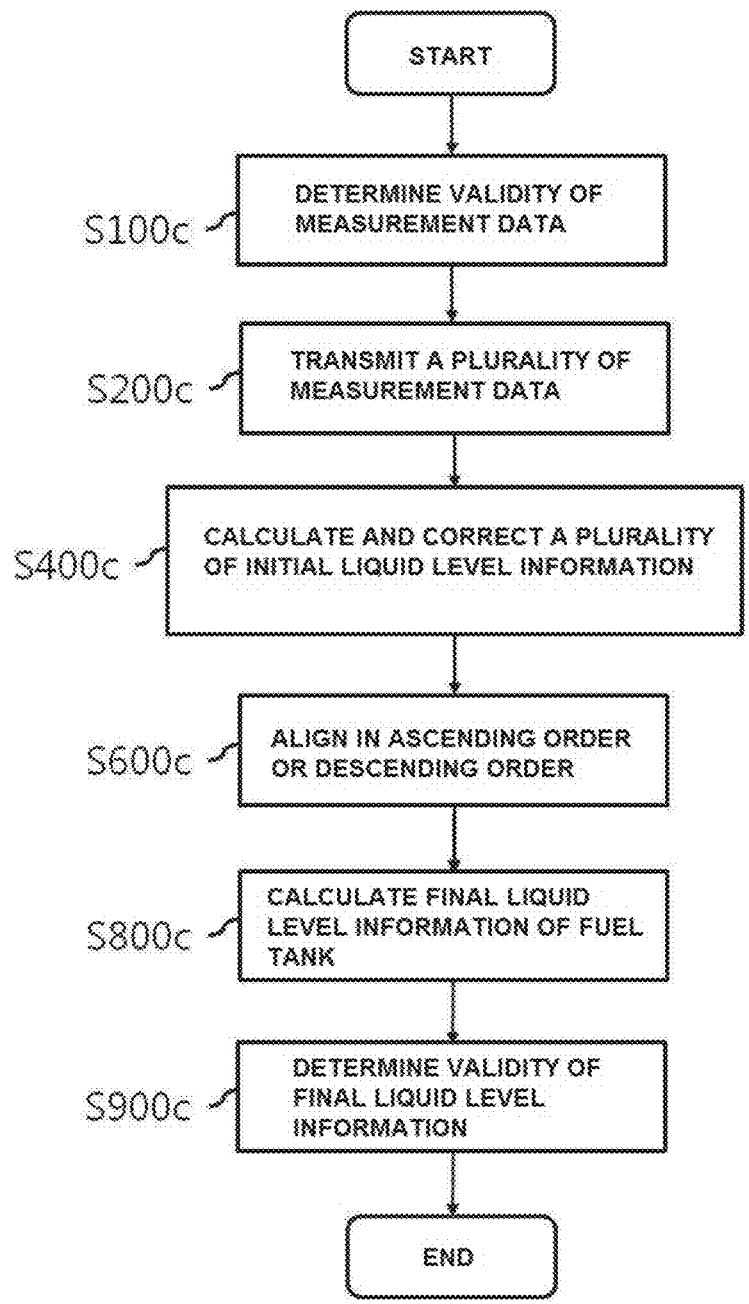
FIG. 13 is a flow chart showing a method for measuring a liquid level of a vehicle fuel tank according to an eighth exemplary embodiment of the present invention.

As shown in FIG. 12, the method for measuring a liquid level of a vehicle fuel tank according to an eighth exemplary embodiment of the present invention includes a first validity determining step (S100c), a measuring step (S200c), a correcting step (S400c), an aligning step (S600c), a liquid level measuring step (S800c), and a final validity determining step (S900c).

Each step will be described below in detail.

In the first validity determining step (S100c), the central processing unit 200 may use the ringing time obtained upon the ultrasonic transmission of the ultrasonic sensor unit 100 to determine the validity of the measurement data transmitted from the ultrasonic sensor unit 100.

In detail, the first validity determination unit 210 of the central processing unit 200 may acquire the ringing time generated when the ultrasonic signal is transmitted from the reference sensor 110 and determine the validity of the time-of-flight reference of the reference sensor 110 using the acquired ringing time, and acquire the ringing time generated when the measurement sensor 120 transmits the ultrasonic signal and determine the validity of the time-of-flight surface level of the measurement sensor 120 using the acquired ringing time.

The ringing time is a pulse signal generated at the time of the initial oscillation, and it is determined that the time-of-flight reference of the reference sensor 110 or the time-of-flight surface level of the measurement sensor 120 is valid if the ringing time of the reference sensor 110 or the ringing time of the measurement sensor 120 is equal to or greater than a preset reference point (threshold).

In other words, as shown in FIG. 5, if the ringing time is equal to or less than a preset reference point, the reference sensor 110 or the measurement sensor 120 is self-diagnosed as having abnormality, and thus it is determined that the time-of-flight reference transmitted from the reference sensor 110 having the abnormality or the time-of-flight surface level transmitted from the measurement sensor 120 having the abnormality is not correct.

The method for measuring a liquid level of a vehicle fuel tank according to the eighth exemplary embodiment of the present invention preferably calculates the liquid level information of the fuel tank and outputs the calculated liquid level information to the vehicle driver, irrespectively of the determination result of the first validity determining step (S100c).

In the measuring step (S200c), the central processing unit 200 may receive the plurality of measurement data from the ultrasonic sensor unit 100.

As described above, the plurality of measurement data are the time-of-flight reference transmitted from the reference sensor 110 and time-of-flight surface level transmitted from the measurement sensor 120 by the preset number of times for the preset time in the ultrasonic sensor unit 100.

In the correcting step (S400c), the central processing unit 200 uses the plurality of measurement data received in the measuring step (S200c) to calculate the plurality of initial liquid level information and excludes the initial liquid level information corresponding to the preset reference value or less or zero from the plurality of initial liquid level information.

In the aligning step (S600c), the central processing unit 200 aligns the initial liquid level information remaining after excluding the initial liquid level information corresponding to the preset reference value or less or zero from the plurality of initial liquid level information in the correcting step (S400c) in an ascending order or a descending order.

In the liquid level measuring step (S800c), the central processing unit 200 uses the plurality of initial liquid level information aligned in the ascending order or the descending order in the aligning step (S600c) to calculate the fuel liquid level information.

In detail, if the number of initial liquid level information remaining after excluding the initial liquid level information or the initial liquid level information corresponding to the preset reference value or less or zero from the plurality of initial liquid level information is odd, the final liquid level information is calculated as the intermediate value.

If the number of initial liquid level information remaining after excluding the initial liquid level information corresponding to the preset reference value or less or zero from the plurality of initial liquid level information is even, the final liquid level information of the fuel tank is calculated as the average value of the intermediate two initial liquid level information.

In the final validity determining step (S900c), the central processing unit 200 determines the validity of the final liquid level information calculated in the liquid level measuring step (S800c), depending on the number of initial liquid level information excluded from the plurality of initial liquid level information in the correcting step (S400c).

That is, in the final validity determining step (S900c), the second validity determination unit 230 of the central processing unit 200 preferably determines that the liquid level information of the fuel tank calculated by the liquid level calculation unit 220 is invalid if the initial liquid level information excluded in the correcting step (S400c) is more than half compared to the initial liquid level information first calculated.

In addition, the method for measuring a liquid level of a vehicle fuel tank according to the eighth exemplary embodiment of the present invention performs the liquid level measuring step (S800c), and then transmits the calculated fuel liquid level information to the liquid level output unit 310 of the display unit 300 to enable the vehicle driver to easily check (recognize) the current remaining amount of fuel in the fuel tank.

However, if the measurement data of the ultrasonic sensor unit 100 is determined to be inaccurate in the first validity determining step (S100c), the method further includes a first displaying step of controlling the system warning unit 320 of the display unit 300 to display the inaccuracy of the liquid level information along with the calculated liquid level information of the fuel tank so that the vehicle driver may recognize the inaccuracy of the liquid level information.

However, in the final validity determining step (S900c), if the final liquid level information calculated in the liquid level measuring step (S800c) is determined to be inaccurate, the method further includes a second displaying step of controlling the system warning unit 320 of the display unit 300 to display the inaccuracy of the liquid level information along with the calculated liquid level information of the fuel tank so that the vehicle driver may recognize the inaccuracy of the liquid level information.

In addition, the method for measuring a liquid level of a vehicle fuel tank according to the eighth exemplary embodiment of the present invention performs the final validity determining step (S900c) and then allows the central processing unit 200 to repeatedly perform the first validity determining step (S100c), the measuring step (S200c), the correcting step (S400c), the aligning step (S600c) the liquid level measuring step (S800c), and the final validity determining step (S900c) to enable the vehicle driver to easily check the current remaining amount of fuel in the fuel tank in real time.

At this time, prior to repeatedly performing the above steps, the central processing unit 200 removes one measurement data first received from the plurality of measurement data received in the measuring step (S200c), and then includes one new measurement data to pack a plurality of measurement data of a new cycle, thereby calculating the fuel liquid level information.

In other words, the system and method for measuring a liquid level of a vehicle fuel tank according to the present invention relates to the system and method for measuring a liquid level of a vehicle fuel tank using the ultrasonic sensor.

At this point, if the vehicle is exposed to the high temperature environment, the fuel in the vehicle fuel tank boils to generate bubbles. In order to solve the problem that the sensing value of the ultrasonic sensor is erroneously generated due to the generated bubbles and the accuracy of the fuel liquid level information is lowered.

The first liquid level information is calculated using the measurement data of the ultrasonic sensor unit sensed by the preset number of times for a preset time and is aligned in the ascending order or the descending order, and then the first liquid level information corresponding to the preset reference value or less or zero is excluded from the plurality of first liquid level information (alternatively, the first liquid level information corresponding to the preset reference value or less or zero is excluded from the plurality of first liquid level information and then may also be aligned in the ascending order or the descending order).

By using the plurality of first liquid level information without the problem of the alignment and the error value, if the number of remaining first liquid level information is odd, the final liquid level information is calculated as the intermediate value.

If the number of remaining first liquid level information is even, the final liquid level information may be calculated as the average value of the intermediate two measurement data.

Thereby, even if the error of the sensing value occurs due to bubbles, it is possible to measure the final liquid level information of the fuel tank with high accuracy.

The system and method for measuring a liquid level of a vehicle fuel tank according to the present invention having the above-described configuration may receive the plurality of liquid level measurement data using the ultrasonic sensor and perform the predetermined calculation process to minimize the measurement error, thereby accurately measuring the liquid level of the fuel in the vehicle fuel tank.

In particular, it is possible to ensure the diversity of the vehicle to which the fuel tank may be applied, by effectively correcting the measurement error of the diffused reflection or scattering phenomenon caused due to the bubbles generated by the boiling of the fuel when the vehicle is located in the high temperature environment.

Further, it is possible to increase the reliability of the system for measuring a liquid level by determining the error (short or open) of the ultrasonic sensor and transmitting the accuracy of the current liquid level information of the fuel tank to the vehicle driver.

In addition, the liquid level measurement data may be analyzed to determine the temporary measurement error due to the inclination as well as the measurement error due to the bubbles or to accurately determine and measure the necessity of oil supply, thereby improving the reliability of the system for measuring a liquid level.

In addition, since the ultrasonic sensor is provided on the bottom surface in the fuel tank, the ultrasonic sensor may be prevented from being exposed to air, such that the error of the ultrasonic sensor due to the exposure may be minimized.

Hereinabove, although the present invention has been described by specific matters such as detailed components, exemplary embodiments, and the accompanying drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

What is claimed is:

1. A system for measuring a liquid level of a vehicle fuel tank, comprising:
an ultrasonic sensor unit provided on a bottom surface in the vehicle fuel tank to acquire measurement data for calculating a distance from the bottom surface in the fuel tank to a fuel surface; and
a central processing unit using the measurement data transmitted from the ultrasonic sensor unit by a preset number of times for a preset time to calculate liquid level information of the fuel tank,
wherein the ultrasonic sensor unit includes:
a reference sensor acquiring a time-of-flight reference (TOF Ref.) for setting a reference of a transmitting and receiving speed of an ultrasonic signal depending on a fuel state in the fuel tank; and
a measurement sensor transmitting an ultrasonic signal to a fuel surface of the fuel tank and receiving a ultrasonic signal reflected from the fuel surface to acquire a time-of-flight surface level (TOF Lev.) for calculating the liquid level of the fuel tank, and
the central processing unit includes:
a first validity determination unit receiving a ringing time acquired upon the transmission of the ultrasonic wave of the measurement sensor to determine validity of the measurement data;
a liquid level calculation unit using the time-of-flight references (TOF Refs.) transmitted from the reference signal and the time-of-flight surface levels (TOF Levs.) transmitted from the measurement sensor by a preset number of times for a preset time to calculate a plurality of initial liquid level information, aligning the plurality of initial liquid level information in an ascending order or a descending order, excluding an initial liquid level information corresponding to a preset reference value or less or zero from the plurality of initial liquid level information, calculating final liquid level information as an intermediate value of the remaining initial liquid level information when the number of initial liquid level information remaining after the exclusion is odd, and calculating the final liquid level information as an average value of the intermediate two measurement data of the remaining initial liquid level information when the number of remaining initial liquid level information is even; and
a second validity determination unit determines the calculated final liquid level information as invalid final liquid level information when the initial liquid level information equal to or more than half based on the number of the plurality of initial liquid level information calculated by the liquid level calculation unit corresponds to the preset reference value or less or zero to thereby determine validity of the liquid level information.

2. The system of claim 1, wherein the first validity determination unit determines the measurement data acquired by the reference sensor or the measurement sensor as valid measurement data if the ringing time of the reference sensor or the ringing time of the measurement sensor is equal to or greater than a preset threshold.

3. The system of claim 1, further comprising:
a display unit outputting the liquid level information of the fuel tank transmitted from the central processing unit to enable a vehicle driver to check the liquid level information.

4. The system of claim 3, wherein the display unit includes:
a liquid level output unit receiving and outputting the liquid level information of the fuel tank calculated by the liquid level calculation unit to enable the vehicle driver to check the liquid level information;
a system warning unit outputting the liquid level information to enable the vehicle driver to recognize accuracy of the liquid level information, depending on the validity of the measurement data determined by the first validity determination unit or the validity of the liquid level information determined by the second validity determination unit; and
a fuel warning unit outputting necessity of oil supply to enable the vehicle driver to recognize the necessity of oil supply, if the liquid level information of the fuel tank calculated by the liquid level calculation unit corresponds to a preset oil supplying reference value or less.

5. A method for measuring a liquid level of a vehicle fuel tank including an ultrasonic sensor unit provided on a bottom surface in the vehicle fuel tank to acquire and transmit measurement data for calculating a distance from the bottom surface in the fuel tank to a fuel surface, the method comprising:
a measuring step of receiving, by a central processing unit, a plurality of measurement data from the ultrasonic sensor unit by a preset number of times for a preset time;
an aligning step of using, by the central processing unit, the plurality of measurement data received in the measuring step to calculate a plurality of initial liquid level information and aligning the plurality of initial liquid level information in an ascending order or a descending order;
a correcting step of excluding, by the central processing unit, initial liquid level information corresponding to a preset reference value or less or zero from the plurality of initial liquid level information aligned in the aligning step;
a liquid level measuring step of using, by the central processing unit, an initial liquid level information remaining after excluding the initial liquid level information in the correcting step to calculate final liquid level information; and
a final validity determining step of determining, by the central processing unit, validity of the final liquid level information calculated in the liquid level measuring step, depending on the number of initial liquid level information excluded from the plurality of initial liquid level information in the correcting step,
wherein the central processing unit determines that the calculated final liquid level information is invalid liquid level information when the number of initial liquid level information excluded from the plurality of initial liquid level information is equal to or more than half based on the number of the plurality of initial liquid level information, and the method further includes a second displaying step of transmitting the liquid level information to a display unit and displaying the liquid level information on the display unit to enable a vehicle driver to recognize accuracy of the liquid level information depending on the validity of the measurement data determined, and wherein after the final liquid level information is calculated, the central processing unit removes one measurement data first received from the plurality of received measurement data, receives one new measurement data, and then repeatedly performs the calculating of the liquid level information.

6. The method of any one of claim 5, wherein when the number of initial liquid level information remaining after excluding the initial liquid level information corresponding to a preset reference value or less or zero from the plurality of initial liquid level information is odd, the central processing unit calculates final liquid level information as an intermediate value, and when the number of initial liquid level information remaining after excluding the initial liquid level information corresponding to a preset reference value or less or zero from the plurality of initial liquid level information is even, the central processing unit calculates the final liquid level information as the average value of intermediate two initial liquid level information.

7. A method for measuring a liquid level of a vehicle fuel tank including an ultrasonic sensor unit provided on a bottom surface in the vehicle fuel tank to acquire and transmit measurement data for calculating a distance from the bottom surface in the fuel tank to a fuel surface, the method comprising:
a first validity determining step of using, by a central processing unit, a ringing time acquired when the ultrasonic sensor unit transmits an ultrasonic wave to determine validity of the measurement data transmitted from the ultrasonic sensor unit;
a measuring step of receiving, by the central processing unit, a plurality of measurement data from the ultrasonic sensor unit by a preset number of times for a preset time;
an aligning step of using, by the central processing unit, the plurality of measurement data received in the measuring step to calculate a plurality of initial liquid level information and aligning the plurality of initial liquid level information in an ascending order or a descending order;
a correcting step of excluding, by the central processing unit, initial liquid level information corresponding to a preset reference value or less or zero from the plurality of initial liquid level information aligned in the aligning step;
a liquid level measuring step of using, by the central processing unit, an initial liquid level information remaining after excluding the initial liquid level information in the correcting step to calculate final liquid level information; and
a final validity determining step of determining, by the central processing unit, validity of the final liquid level information calculated in the liquid level measuring step, depending on the number of initial liquid level information excluded from the plurality of initial liquid level information in the correcting step,
wherein the central processing unit uses the ringing time acquired when the ultrasonic sensor unit transmits an ultrasonic wave to determine the measurement data transmitted from the ultrasonic sensor unit as valid measurement data if the ringing time is equal to or greater than a preset threshold, and
the method further includes a first displaying step of transmitting the liquid level information to a display unit and displaying the liquid level information on the display unit to enable a vehicle driver to recognize accuracy of the liquid level information depending on the validity of the measurement data determined, and
the central processing unit determines that the calculated final liquid level information is invalid liquid level information when the number of initial liquid level information excluded from the plurality of initial liquid level information is equal to or more than half based on the number of the plurality of initial liquid level information, and
the method further includes a second displaying step of transmitting the liquid level information to the display unit and displaying the liquid level information on the display unit to enable a vehicle driver to recognize accuracy of the liquid level information depending on the validity of the measurement data determined, and
wherein after the final liquid level information is calculated, the central processing unit removes one measurement data first received from the plurality of received measurement data, receives one new measurement data, and then repeatedly performs the calculating of the liquid level information.

8. The method of any one of claim 7, wherein when the number of initial liquid level information remaining after excluding the initial liquid level information corresponding to a preset reference value or less or zero from the plurality of initial liquid level information is odd, the central processing unit calculates final liquid level information as an intermediate value, and when the number of initial liquid level information remaining after excluding the initial liquid level information corresponding to a preset reference value or less or zero from the plurality of initial liquid level information is even, the central processing unit calculates the final liquid level information as the average value of intermediate two initial liquid level information.

9. A method for measuring a liquid level of a vehicle fuel tank including an ultrasonic sensor unit provided on a bottom surface in the vehicle fuel tank to acquire and transmit measurement data for calculating a distance from the bottom surface in the fuel tank to a fuel surface, the method comprising:
a measuring step of receiving, by the central processing unit, the plurality of measurement data from the ultrasonic sensor unit by a preset number of times for a preset time;
a correcting step of using, by the central processing unit, the plurality of measurement data received in the measuring step to calculate a plurality of initial liquid level information and excluding initial liquid level information equal to or less than a preset reference value or zero from the plurality of initial liquid level information;
an aligning step of aligning, by the central processing unit, the initial liquid level information remaining after excluding the initial liquid level information in the correcting step in an ascending order or a descending order;
a liquid level measuring step of using, by the central processing unit, the initial liquid level information aligned in the aligning step to calculate final liquid level information; and
a final validity determining step of determining, by the central processing unit, validity of the final liquid level information calculated in the liquid level measuring step, depending on the number of initial liquid level information excluded from the plurality of initial liquid level information in the correcting step, wherein the central processing unit determines that the calculated final liquid level information is invalid liquid level information when the number of initial liquid level information excluded from the plurality of initial liquid level information is equal to or more than half based on the number of the plurality of initial liquid level information, and the method further includes a second displaying step of transmitting the liquid level information to a display unit and displaying the liquid level information on the display unit to enable a vehicle driver to recognize accuracy of the liquid level information depending on the validity of the measurement data determined, and wherein after the final liquid level information is calculated, the central processing unit removes one measurement data first received from the plurality of received measurement data, receives one new measurement data, and then repeatedly performs the calculating of the liquid level information.

10. The method of any one of claim 9, wherein when the number of initial liquid level information remaining after excluding the initial liquid level information corresponding to a preset reference value or less or zero from the plurality of initial liquid level information is odd, the central processing unit calculates final liquid level information as an intermediate value, and when the number of initial liquid level information remaining after excluding the initial liquid level information corresponding to a preset reference value or less or zero from the plurality of initial liquid level information is even, the central processing unit calculates the final liquid level information as the average value of intermediate two initial liquid level information.

11. A method for measuring a liquid level of a vehicle fuel tank including an ultrasonic sensor unit provided on a bottom surface in the vehicle fuel tank to acquire and transmit measurement data for calculating a distance from the bottom surface in the fuel tank to a fuel surface, the method comprising:

a first validity determining step of using, by a central processing unit, a ringing time acquired when the ultrasonic sensor unit transmits an ultrasonic wave to determine validity of measurement data transmitted from the ultrasonic sensor unit;

a measuring step of receiving, by the central processing unit, the plurality of measurement data from the ultrasonic sensor unit by a preset number of times for a preset time;

a correcting step of using, by the central processing unit, the plurality of measurement data received in the measuring step to calculate a plurality of initial liquid level information and excluding initial liquid level information equal to or less than a preset reference value or zero from the plurality of initial liquid level information;

an aligning step of aligning, by the central processing unit, an initial liquid level information remaining after excluding the initial liquid level information in the correcting step in an ascending order or a descending order;

a liquid level measuring step of using, by the central processing unit, the initial liquid level information aligned in the aligning step to calculate final liquid level information; and a final validity determining step of determining, by the central processing unit, validity of the final liquid level information calculated in the liquid level measuring step, depending on the number of initial liquid level information excluded from the plurality of initial liquid level information in the correcting step, wherein the central processing unit uses the ringing time acquired when the ultrasonic sensor unit transmits an ultrasonic wave to determine the measurement data transmitted from the ultrasonic sensor unit as valid measurement data if the ringing time is equal to or greater than a preset threshold, and the method further includes a first displaying step of transmitting the liquid level information to a display unit and displaying the liquid level information on the display unit to enable a vehicle driver to recognize accuracy of the liquid level information depending on the validity of the measurement data determined, and the central processing unit determines that the calculated final liquid level information is invalid liquid level information when the number of initial liquid level information excluded from the plurality of initial liquid level information is equal to or more than half based on the number of the plurality of initial liquid level information, and the method further includes a second displaying step of transmitting the liquid level information to the display unit and displaying the liquid level information on the display unit to enable a vehicle driver to recognize accuracy of the liquid level information depending on the validity of the measurement data determined, and wherein after the final liquid level information is calculated, the central processing unit removes one measurement data first received from the plurality of received measurement data, receives one new measurement data, and then repeatedly performs the calculating of the liquid level information.

12. The method of any one of claim 11, wherein when the number of initial liquid level information remaining after excluding the initial liquid level information corresponding to a preset reference value or less or zero from the plurality of initial liquid level information is odd, the central processing unit calculates final liquid level information as an intermediate value, and when the number of initial liquid level information remaining after excluding the initial liquid level information corresponding to a preset reference value or less or zero from the plurality of initial liquid level information is even, the central processing unit calculates the final liquid level information as the average value of intermediate two initial liquid level information.

* * * * *